United States Patent
Bhattacharjee et al.

(10) Patent No.: US 11,546,652 B2
(45) Date of Patent: *Jan. 3, 2023

(54) SYSTEMS AND METHODS FOR STORING OFFSETS OF A RECORDED PROGRAM IN A NETWORK DVR

(71) Applicant: Rovi Guides, Inc., San Jose, CA (US)

(72) Inventors: Pushpita Bhattacharjee, Karnataka (IN); Nimit Dineshbhai Kalaria, Gujarat (IN); Smitha Mave, Karnataka (IN); Vishwas Sharadanagar Panchaksharaiah, Karnataka (IN); Milan Indu Patel, Santa Clara, CA (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/171,355

(22) Filed: Feb. 9, 2021

(65) Prior Publication Data
US 2021/0168436 A1 Jun. 3, 2021

Related U.S. Application Data

(63) Continuation of application No. 16/472,189, filed as application No. PCT/US2016/068070 on Dec. 21, 2016, now Pat. No. 10,951,943.

(51) Int. Cl.
*H04N 21/43* (2011.01)
*H04N 21/433* (2011.01)
(Continued)

(52) U.S. Cl.
CPC ..... *H04N 21/4334* (2013.01); *H04N 21/2181* (2013.01); *H04N 21/26233* (2013.01); *H04N 21/4147* (2013.01)

(58) Field of Classification Search
CPC .......... H04N 21/4334; H04N 21/2181; H04N 21/26233; H04N 21/4147; H04N 21/4335; H04N 21/47214; H04N 5/76; H04N 5/775
See application file for complete search history.

(56) References Cited

U.S. PATENT DOCUMENTS

| | | | |
|---|---|---|---|
| 6,239,794 B1 | 5/2001 | Yuen et al. | |
| 6,564,378 B1 | 5/2003 | Satterfield et al. | |

(Continued)

FOREIGN PATENT DOCUMENTS

| | | |
|---|---|---|
| WO | WO2007041588 | 4/2007 |
| WO | WO2012018558 | 2/2012 |

OTHER PUBLICATIONS

PCT International Search Report and Written Opinion in Application No. PCT/US2016/068070, dated Sep. 7, 2017 (14 pages).

*Primary Examiner* — Jefferey F Harold
*Assistant Examiner* — Timothy R Newlin
(74) *Attorney, Agent, or Firm* — Haley Guiliano LLP

(57) ABSTRACT

Systems and methods are described to address shortcomings in the conventional network storage systems via novel techniques to store offsets of a recorded program in a network digital video recorder (DVR). Storing offsets of a recorded program may be beneficial to users that would like to record media content that is broadcast either prior to a start time of a program, or media content that is broadcast after an end time of a program. This feature may be useful when start times and end times of a program are variable (e.g., in the case of sporting events, or other real-time events). This feature may also be useful for recording content of interest that is scheduled for broadcast prior to a start time of or after an end time of the program.

20 Claims, 11 Drawing Sheets

(51) Int. Cl.
*H04N 21/218* (2011.01)
*H04N 21/262* (2011.01)
*H04N 21/4147* (2011.01)

(56) References Cited

U.S. PATENT DOCUMENTS

| | | | | |
|---|---|---|---|---|
| 7,165,098 | B1* | 1/2007 | Boyer | H04N 21/4782 709/219 |
| 7,743,398 | B2* | 6/2010 | DeYonker | H04N 21/84 725/58 |
| 7,761,892 | B2* | 7/2010 | Ellis | H04N 21/26283 725/44 |
| 8,046,801 | B2 | 10/2011 | Ellis et al. | |
| 2002/0174430 | A1* | 11/2002 | Ellis | H04N 21/47 725/46 |
| 2002/0191954 | A1* | 12/2002 | Beach | H04N 5/782 386/294 |
| 2004/0013409 | A1* | 1/2004 | Beach | H04N 21/4348 386/260 |
| 2005/0251827 | A1* | 11/2005 | Ellis | H04N 7/163 725/47 |
| 2009/0142036 | A1* | 6/2009 | Branam | H04N 21/4583 386/248 |
| 2009/0245750 | A1* | 10/2009 | Dodd | H04N 21/47214 386/248 |
| 2010/0115545 | A1* | 5/2010 | Overbaugh | H04N 5/782 725/28 |
| 2010/0153885 | A1 | 6/2010 | Yates | |
| 2010/0166385 | A1* | 7/2010 | Okuda | H04N 21/47214 386/291 |
| 2012/0294591 | A1* | 11/2012 | Alexander | H04N 5/782 386/292 |
| 2013/0055312 | A1* | 2/2013 | Cheng | H04N 21/4325 725/49 |
| 2014/0337909 | A1* | 11/2014 | Phillips | H04N 21/26258 725/115 |
| 2014/0373080 | A1 | 12/2014 | Rogers | |
| 2015/0163547 | A1* | 6/2015 | Whitten | H04N 21/242 725/58 |
| 2019/0132070 | A1* | 5/2019 | Beck | H04N 21/4334 |
| 2020/0092601 | A1* | 3/2020 | Bhattacharjee | H04N 21/2181 |
| 2021/0168436 | A1* | 6/2021 | Bhattacharjee | H04N 21/4334 |

* cited by examiner

300 ⬎

| User-Id | Content-Id | Start-Offset | End-Offset |
|---|---|---|---|
| A  380a | P1  350a | 0  360a | 0  370a |
| B  380b | P1  350b | 0  360b | 0  370b |
| C  380c | P1  350c | +30  360c | +60  370c |
| D  380d | P1  350d | +40  360d | 0  370d |

305 → row 1; 310 → row 2; 315 → row 3; 320 → row 4

380 (User-Id); 350 (Content-Id); 360 (Start-Offset); 370 (End-Offset)

User-Content table

| Content-Id | Largest-Start-Offset | Largest-End-Offset | Hits |
|---|---|---|---|
| P1  450a | +40  460a | +60  470a | 4  480a |

405 → row 1

450 (Content-Id); 460 (Largest-Start-Offset); 470 (Largest-End-Offset); 480 (Hits)

Content-Hits table

FIG. 4

SYSTEMS AND METHODS FOR STORING OFFSETS OF A RECORDED PROGRAM IN A NETWORK DVR

This application is a continuation of U.S. patent application Ser. No. 16/472,189, filed Jun. 20, 2019, which is a national stage application under 35 U.S.C. § 371 of International Application PCT/US2016/068070, filed Dec. 21, 2016, each of which are hereby incorporated by reference herein in their entireties.

BACKGROUND OF THE INVENTION

Conventional network storage systems store media assets, such as real-time broadcast network television, on a server or network of storage devices. These conventional network storage systems facilitate time-shifted viewing of broadcast programs, and allow users to record and watch media assets at their convenience without the requirement of a local digital video recorder device within the user's home. However, these conventional network storage systems face several challenges in their implementations. For example, storing multiple copies of a same media asset at a server requires an amount of disk space that is proportional to a number of users that request to store the media asset. For example, when media assets are stored on a distributed network of servers, distribution of the media assets to multiple user devices may consume an excessive amount of bandwidth within the network. For example, when storing media assets at the server for shared access by a multiple number of a users, violation of copyrights may be implicated if some of the multiple number of users are able to access media content that they are not authorized to access (e.g., because they have not obtained a copyright to access the content). This issue of copyright violation may be compounded when multiple users request to record different offset portions from a media asset (e.g., portions of media content prior to a start time, or after an end time of a media asset). Conventional network storage systems are unable to deal with the process of recording, deleting and accessing offset portions of media assets that efficiently utilize storage resources, network resources (e.g., bandwidth), and avoid copyright violations.

SUMMARY

Accordingly, systems and methods are described to address shortcomings in the conventional network storage systems via novel techniques to store offsets of a recorded program in a network digital video recorder (DVR). Storing offsets of a recorded program may be beneficial to users that would like to record media content that is broadcast either prior to a start time of a program, or media content that is broadcast after an end time of a program. This feature may be useful when start times and end times of a program are variable (e.g., in the case of sporting events, or other real-time events). For example, a basketball game may unexpectedly go into triple overtime, and extend 30 minutes beyond its expected end time. A user may request to record the basketball game with a 30-minute offset after the scheduled end time of a broadcast of the basketball game. This feature may also be useful for recording content of interest that is scheduled for broadcast prior to a start time or after an end time of the program. For example, a sports game may include pre-game commentary that is broadcast during an eight minute interval prior to the scheduled start time of a broadcast of a football game. A user may request to record the football game with a 10-minute offset prior to the scheduled start time of the broadcast of the football game.

The systems and methods are applicable to shared copy implementations of a network DVR, where a single copy of a media asset is stored for shared access among multiple users who request to store the media asset, and are also applicable to private copy implementations of a network DVR, where a single copy of a media asset is stored for each requesting user. The shared copy implementations are first discussed, followed by the private copy implementations.

Systems and methods implementing a novel technique in a shared copy network DVR determine a largest offset based on multiple requests of multiple respective users to store a same program with different offsets. The systems and methods store a copy of the program and media content associated with the largest offset for shared access by the multiple respective users. By storing a copy of the program and media content associated with the largest offset for shared access, the systems and methods reduce the amount of disk space required to store the program, and the media content associated with multiple different offsets. This implementation may be beneficial when there is overlap among offsets requested for recording by the multiple users. For example, a first user may request to record with a first offset (e.g., start recording 10 minutes prior to a start time of a program), and a second user may request to record with a second offset (e.g., start recording five minutes prior to a start time of a program). Instead of recording separate copies of media content associated with the 10 minutes and the five minutes, the methods and systems determine that the largest offset is 10 minutes, and then record the copy of the 10 minutes for shared access by the first user and second user.

For example, systems and methods implementing the novel technique receive from a first user device associated with a first user, a first request to store a first media asset (e.g., a program scheduled for broadcast at 8:00 pm), and receive from a second user device associated with a second user, a second request to store the first media asset (e.g., the program scheduled for broadcast at 8:00 pm). The first request includes a first offset from the first media asset (e.g., 10 minutes prior to the start time of the first media asset), and the second request includes a second offset (e.g., five minutes prior to the start time of the first media asset). The systems and methods compare the first offset and the second offset, and then determine, based on the comparing, a largest start-offset (e.g., 10 minutes) from the start time of the first media asset. The systems and methods then store media content (e.g., audio, video, and associated metadata) associated with the first media asset and the largest start-offset (e.g., media content that is broadcast in an interval 10 minutes prior to the start time of the first media asset), in one or more storage devices (e.g., a cloud-based storage system).

In some aspect, systems and methods are provided for storing and delivering media assets in a content delivery network. A system may receive, from a first user device associated with a first user, a first request to store a first media asset, where the first request includes a first start-offset from a start time of the first media asset and a first end-offset from an end time of the first media asset. For example, the system may receive from the first user device (e.g., a set-top terminal, a tablet computer, etc.) a request to store a football game scheduled for broadcast with a start time of 8 PM and an end time of 10 PM, with a start-offset of 10 minutes prior to the 8 PM start time of the broadcast, and an end-offset of five minutes after the 10 PM end time of the broadcast. The system may receive, from a second user device associated with a second user, a second request to store the first media asset, where the second request includes a second start-offset from the start time of the first media asset and a second end-offset from the end time of the first media asset. For example, the system may receive from the second user device (e.g., a set-top terminal, a table computer, etc.) a request to store the same football game, scheduled requested for recording by the first user device, with a start-offset of five minutes prior to the 8 PM start time of the broadcast, and an end-offset of 10 minutes after the 10 PM end time.

The system may determine whether the first start-offset is larger than a largest start-offset of an entry associated with the first media asset in a content-hits table. For example, the system may store a content-hits table that tracks a number of requests to record a media asset (e.g., a sports game or other television program), and a largest start-offset and/or a largest end-offset associated with the first media asset. The system may retrieve an entry associated with the first media asset from the content-hits table (e.g., by issuing a query to a database storing the content-hits table), and retrieve a largest start-offset value included in the entry. The system may compare the first start-offset, included in the first request to store the first media asset, to the largest start-offset of the entry associated with the first media asset.

The system may update the largest start-offset of the entry associated with the first media asset to the first start-offset based on determining that the first start-offset is larger than the largest start offset. For example, based on comparing the first start-offset, included in the first request to store the first media asset, to the largest start-offset of the entry associated with the first media asset, the system may determine that the first start-offset is larger than the largest start-offset of the entry, and then update the largest start-offset of the entry associated with the first media asset to the first start-offset (e.g., by issuing an update command to the database storing the content-hits table).

The system may determine whether the second start-offset is larger than the largest start-offset of the entry associated with the first media asset in the content-hits table. The system may retrieve the entry associated with the first media asset from the content-hits table (e.g., by issuing a query to a database storing the content-hits table), and retrieve the largest start-offset value included in the entry. The system may compare the second start-offset, included in the second request to store the first media asset, to the largest start-offset of the entry associated with the first media asset.

The system may update the largest start-offset of the entry associated with the first media asset to the second start-offset based on determining that the second start-offset is larger than the largest start offset. For example, based on comparing the second start-offset, included in the second request to store the first media asset, to the largest start-offset of the entry associated with the first media asset, the system may determine that the second start-offset is larger than the largest start-offset of the entry, and then update the largest start-offset of the entry associated with the first media asset to the second start-offset (e.g., by issuing an update command to the database storing the content-hits table).

The system may determine whether the first end-offset is larger than a largest end-offset of the entry associated with the first media asset in the content-hits table. The system may retrieve the entry associated with the first media asset from the content-hits table (e.g., by issuing a query to a database storing the content-hits table), and retrieve a largest end-offset value included in the entry. The system may compare the first end-offset, included in the first request to store the first media asset, to the largest end-offset of the entry associated with the first media asset.

The system may update the largest end-offset of the entry associated with the first media asset to the first end-offset based on determining that the first end-offset is larger than the largest end-offset. For example, based on comparing the first end-offset, included in the first request to store the first media asset, to the largest end-offset of the entry associated with the first media asset, the system may determine that the first end-offset is larger than the largest end-offset of the entry, and then update the largest end-offset of the entry associated with the first media asset to the first end-offset (e.g., by issuing an update command to the database storing the content-hits table).

The system may determine whether the second end-offset is larger than the largest end-offset of the entry associated with the first media asset in the content-hits table. The system may retrieve the entry associated with the first media asset from the content-hits table (e.g., by issuing a query to a database storing the content-hits table), and retrieve the largest end-offset value included in the entry. The system may compare the second end-offset, included in the second request to store the first media asset, to the largest end-offset of the entry associated with the first media asset.

The system may update the largest end-offset of the entry associated with the first media asset to the second end-offset based on determining that the second end-offset is larger than the largest end-offset. For example, based on comparing the second end-offset, included in the second request to store the first media asset, to the largest end-offset of the entry associated with the first media asset, the system may determine that the second end-offset is larger than the largest end-offset of the entry, and then update the largest end-offset of the entry associated with the first media asset to the second end-offset (e.g., by issuing an update command to the database storing the content-hits table).

The system may store the media content associated with the first media asset, the largest start-offset and the largest end-offset in one or more storage devices, based on the largest start-offset, and the largest end-offset. For example, the system may store the media content in a cloud-based system of storage devices, by setting a timer to begin storing media content at a time corresponding to the largest start-offset from the start time of the first media asset (e.g., at 7:50 PM, 10 minutes prior to an 8:00 PM start time). For example, the system may continue to store media content until a time corresponding to the largest end-offset from the end time of the first media asset (e.g., at 10:10 PM, 10 minutes after a 10:00 PM end time).

In some embodiments, the system may store a single copy of the first media asset at a server, based on receiving the first request to store the first media asset and based on receiving the second request to store the first media asset. For example, in a shared copy implementation of a network DVR, storing the single copy of the first media asset based on receiving the first request and the second request reduces the amount of storage space required at the server to accommodate multiple users. For example, the system may store a single file (or collection of file segments) of media content corresponding to the first media asset at a digital storage device at a server (e.g., an origin server, a cache server, or other suitable server), based on receiving the first request to store the media asset and based on receiving the second request to store the media asset.

In some embodiments, the system may update the entry associated with the first media asset in the content-hits table to increment a count of requests to store the first media asset, based on receiving the first request to store the first media asset. For example, the system updates the entry to increment the count of requests (e.g., by issuing a command to a database storing the content-hits table to update the count value; or by retrieving the count value, incrementing the count value, and then issuing a command to the database to write back the incremented count value to the database) to store the first media asset, based on receiving the first request (e.g., a command from the first user device) to store the first media asset, in order to keep track of a number of requests to store the first media asset. In some embodiments, the system may update the entry associated with the first media asset in the content-hits table to increment the count of requests, based on receiving the second request to store the first media asset. For example, the system updates the entry to increment the count of requests (e.g., by issuing a command to a database storing the content-hits table to update the count value; or by retrieving the count value, incrementing the count value, and then issuing a command to the database to write back the incremented count value to the database) to store the first media asset, based on receiving the second request (e.g., a command from the second user device) to store the first media asset, in order to keep track of the number of requests to store the first media asset.

In some embodiments, the system may update a user content table to include a first entry associated with a first user, where the first entry includes an identifier of the first media asset, the first start offset, and the first end offset. The user content table may be used to track requests by each user to record a respective media asset with respective start-offsets and end-offsets. For example, the system may update a user content table (e.g., stored in a database) to include a first entry associated with a first user (e.g., by issuing a create entry command to the database), where the first entry includes an identifier of the first media asset (e.g., a serial number, hash code, title, or other identifier of a broadcast of a football game), the first start-offset (e.g., 10 minutes prior to the start time of the broadcast), and the first end-offset (e.g., five minutes after the end time of the broadcast). In some embodiments, the system may update the user content table to include a second entry associated with the second user, where the second entry includes an identifier of the first media asset, the first start offset, and the first end offset. For example, the system may update the user content table (e.g., stored in the database) to include a second entry associated with a second user (e.g., by issuing a create entry command to the database), where the second entry includes the identifier of the first media asset (e.g., a serial number, hash code, title, or other identifier of a broadcast of a football game), the first start-offset (e.g., five minutes prior to the start time of the broadcast), and the first end-offset (e.g., 10 minutes after the end time of the broadcast).

In some embodiments, the first start-offset includes at least one of a positive offset (e.g., a positive number 10) corresponding to a time prior to the start time of the first media asset (e.g., 10 minutes prior to the start time), and a negative start-offset (e.g., a negative number 5) corresponding to a time after the start time of the first media asset (e.g., five minutes after the start time). In some embodiments, the second start-offset includes at least one of a positive offset (e.g., a positive number 5) corresponding to a time after the start time of the first media asset (e.g., five minutes prior to the start time), and a negative start-offset (e.g., a negative number 10) corresponding to a time after the start time of the first media asset (e.g., 10 minutes after the start time).

In some embodiments, the first end-offset includes at least one of a positive offset (e.g., a positive number 10) corresponding to a time after to the end time of the first media asset (e.g., 10 minutes after to the end time), and a negative offset (e.g., a negative number 5) corresponding to a time before the end time of the first media asset (e.g., five minutes before the end time). In some embodiments, the second end-offset includes at least one of a positive offset (e.g., a positive number 5) corresponding to a time after the end time of the first media asset (e.g., 5 minutes after to the end time), and a negative end-offset (e.g., a negative number 10) corresponding to a time before the end time of the first media asset (e.g., 10 minutes before the end time).

In some embodiments, the system further receives, from the first user device associated with the first user, a first request to delete the first media asset. For example, the system may receive from the first user device a command to delete the first media asset that was previously requested for recording by the user. The system may decrement the count of requests to record the first media asset, based on receiving the first request to delete the first media asset. For example, the system may decrement the count of requests (e.g., by issuing a command to a database storing the content-hits table to update the count value; or by retrieving the count value, decrementing the count value, and then issuing a command to the database to write back the decremented count value to the database).

The system may determine whether the count of requests to record the media asset is greater than zero. For example, the system may compare the count of requests to record the media asset to zero (e.g., as a software routine by comparing a variable associated with the count of requests, or in hardware by using a comparator to compare values from a register storing the count of requests to a value of zero). The system may determine that the count of requests is greater than zero, and based on determination, the system may delete offsets associated with the first user. The system may retrieve a first entry (e.g., corresponding to the first media asset requested for deletion by the received first request) associated with the first user, from a user content table (e.g., by issuing a retrieval query to a database), where the first entry includes an identifier of the first media asset, the first start-offset (e.g., 10 minutes), the first end-offset (e.g., five minutes).

The system may determine whether the first start-offset is the largest start-offset among entries of the user content table associated with the first media asset. For example, the system may issue a query to the database to compare the first start-offset to all start-offsets in the user content table. The system may, based on determining that the first start-offset is the largest start-offset among entries of the user content table associated with the first media asset, determine the second largest start-offset among entries of the user content table associated with the first media asset. For example, the system may issue a command to the database to retrieve a set of all start-offsets less than the first start-offset and then issue a command to sort the retrieved set of start-offsets by ascending value and extract the largest start-offset of the sorted set of start-offsets.

The system may determine whether the first end-off set is the largest end-offset among entries of the user content table associated with the first media asset. For example, the system may issue a query to the database to compare the first end-offset to all end-offsets in the user content table. The system may, based on determining that the first end-offset is the largest end-offset among entries of the user content table associated with the first media asset, determine the second largest end-offset among entries of the user content table associated with the first media asset. For example, the system may issue a command to the database to retrieve a set of all end-offsets less than the first end-offset and then issue a command to sort the retrieved set of end-offsets by ascending value and extract the largest end-offset of the sorted set of end-offsets The system may delete media content associated with a time interval between the first start-offset and the second largest start offset, and a time interval between the first end-offset and the second largest end offset, based on determining that the first start-offset is the largest end offset, determining that the first end-offset is the largest end-offset and receiving the first request to delete the first media asset. The system may delete media content that is associated with the first user, and not other users, by deleting portions of media associated with an interval between the first offset and a second largest offset. For example, the system may delete media content associated with a time interval between the first start-offset and the second largest start-offset (e.g., by issuing a command to a storage device to delete segments or frames of video associated with the time interval), and a time interval between the first end-offset and the second largest end-offset (e.g., by issuing a command to a storage device to delete segments or frames of video associated with the time interval).

In some embodiments, the system may receive from the first user device associated with the first user, a first request (e.g., a delete command including an identifier of the first media asset) to delete the first media asset. The system may update the user content table to remove the first entry associated with the first user (e.g., by issuing a delete command to the database in which the user content table is stored, to delete the first entry), based on receiving the first request to delete the first media asset. The system may receive from the second user device associated with the second user, a second request (e.g., a delete command including the identifier of the first media asset) to delete the first media asset. The system may update the user content table to remove the second entry associated with the second user (e.g., by issuing a delete command to the database in which the user content table is stored, to delete the second entry), based on receiving the second request to delete the first media asset.

In some embodiments, the system may receive from the first user device, associated with the first user, a first request to access the first media asset. For example, the system may receive a command to play back the first media asset. The system may, based on receiving the first request to access the first media asset, retrieve the first entry (e.g., by issuing a query to a database storing the user content table), associated with the first user, from the user content table, where the first entry includes the identifier of the first media asset, the first start-offset (e.g., 10 minutes prior to the start time of the game) and the first end-offset (e.g., five minutes after the end time of the football game). The system may transmit media content associated with the first media asset, the first start offset, and the first end-offset to the user device. For example, the system may deliver, across an internet protocol connection to the user device, media content (e.g., audio and/or) associated with the first media asset, the first start offset, and the first end-offset to the user device.

In some embodiments, the first request to access the first media asset is associated with a third start offset, and the system may determine that the third start-offset is greater than the first start offset, and based on the determining that the third start-offset is greater than the first start offset, restrict access of the first user to media content associated with the first media asset and the first start offset. For example, the first request to access the first media asset may be associated with a third start-offset (e.g., 20 minutes). The first request may be received from the first user device and be associated with the first user. For example, the system may compare the third start-offset (e.g., 20 minutes) with the first start-offset (e.g., 10 minutes) and determine that the third start-offset is greater than the first start offset. Based on determining that third start-offset is greater than the first start offset, the system may restrict access of the first user to media content associated with the first media asset and the first start-offset by retrieving media content up to the first start-offset without retrieving media up to the third start-offset (even if available). For example, the first start-offset (e.g., 10 minutes) may not be the largest start-offset in an associated entry in the content-hits table, if another request to store the first media asset had been received from a third user device having start-offset (e.g., 30 minutes), which is greater than the first start offset.

Systems and methods may also implement a novel technique in a private copy network DVR or virtual private copy network DVR. The systems and methods implementing a private copy network DVR are similar to the systems and methods implementing a shared copy network DVR except that the systems and methods store a single copy of a media asset for each requesting user, or responsive to each request from a different user. The system implementing the private copy network DVR may store a first copy of media content associated with a first media asset responsive to a first request to store the first media asset from a first user device associated with a first user, and may store a second copy of the media content associated with the first media asset responsive to a second request to store the first media asset responsive to a second request to store the first media asset from the first user. The system implementing the private copy network DVR may store media content associated with a first start-offset and first end-offset (e.g., received as part of a first request from a first user device associated with a first user to store the first media asset) as a first set of files, and may store media content associated with a second start-offset and second end-offset (e.g., received as part of a second request from a second user device associated with a second user to store the second media asset) as a second set of files, even though there may be overlap in the media content of the first offsets and the second offsets.

The systems and methods implementing a virtual private copy network DVR are a hybrid between the systems and methods implementing the shared copy network DVR and the system and methods implementing the private copy network DVR. For example, in the context of a content delivery network, including an origin server (e.g., located at a distribution facility), and cache servers (e.g., located spatially near the first user device and the second user device from which requests to store the first media asset are received), the systems and methods implementing the virtual private copy network DVR may store a single copy of the first media asset for shared access at the origin server, and may store media content associated with a first start-offset and first end-offset (e.g., received as part of a first request from a first user device associated with a first user to store the first media asset) as a first set of files in a first set of one or more of the cache servers, and may store the media content associated with a second start-offset and second end-offset (e.g., received as part of a second request from a second user device associated with a second user to store the second media asset) as a second set of files in a second set of one ore more of the cache servers, which may be the same, different, or overlap the first set of cache servers.

In some embodiments, the system may determine a first location of the first user device and a second location of the second user device (e.g., by analyzing IP addresses and/or cellular telephone network identifiers associated with the first user device and the second user device, respectively). The system may determine whether the first location and the second location are within a same geographic region (e.g., by comparing the IP addresses and/or or cellular telephone network identifiers associated with the first user device and the second user device, respectively). Based on determining that the first location and the second location are within the same geographic region, the system may select a first cache server based on the first location of the first user device and the second location of the second user device. For example, the system may issue a look-up command for a cache server from a table of cache servers.

The system may store media content within the first start-offset (e.g., media content associated within an interval between the first start-offset and a start time of the first media asset) to the first cache server based on receiving the first request to store the first media asset. The system may store media content within the second start-offset (e.g., media content associated within an interval between the second start-offset and the start time of the first media asset) to the second cache server based on receiving the second request to store the first media asset. The system may receive a request to play back the first media asset and the media content within the first start-offset from the first user device. For example, the system may receive a play back command including an identifier of the first media asset and an identifier of the first user device and/or an identifier of the first user associated with the first user device. The system may transmit, from the first cache server, the media content within the first start-offset from the first media asset to the first user device. For example, the system may retrieve the first media asset from the origin server or from the first cache server based on the identifier of the first media asset, and/or may retrieve from the first cache server the media content within the first start-offset based on the identifier of the first user device and/or the identifier of the user associated with the first user device. The system may transmit the retrieved content to the first user device using an internet protocol, or other networking protocol.

The system may receive a request to play back the first media asset and the media content within the second start-offset from the second user device. For example, the system may receive a play back command including an identifier of the first media asset and an identifier of the second user device and/or an identifier of the second user associated with the second user device. The system may transmit, from the first cache server, the media content within the second start-offset from the first media asset to the second user device. For example, the system may retrieve the first media asset from the origin server or from the first cache server based on the identifier of the first media asset, and/or may retrieve from the first cache server the media content within the second start-offset based on the identifier of the second user device and/or the identifier of the user associated with the second user device. The system may transmit the retrieved content to the second user device using an internet protocol, or other networking protocol.

The system may restrict access by the first user device and/or the first user (e.g., using a different user device) to the media content within the second start-offset from the first media asset stored at the first cache server. For example, the system may not permit retrieval of the files associated with the media content within the first start-offset responsive to receiving a user command that includes an identifier of second user device and/or second user that does not match the identifier of the first user device and/or first user. The system may restrict access by the second user to the media content within the first start-offset from the first media asset stored at the first cache server. For example, the system may not permit retrieval of the files associated with the media content within the second start-offset responsive to receiving a user command that includes an identifier of first user device and/or first user that does not match the identifier of the second user device and/or second user.

In some embodiments, the system may store a copy of the first media asset at the first cache server based on determining that a count of requests to store the first media asset exceeds a threshold. For example, the system may initially be configured to store a single copy the first media asset at the origin server, because the single copy at the origin server may be distributed to multiple cache servers. However, in order to exploit spatial locality, the system may store a copy of the first media asset at the first cache server, based on receiving multiple requests to store the first media asset from multiple user devices that are within a same geographic location as the first cache server, where the number exceeds a threshold (e.g., which may be a fixed number, or a percentage of total requests to store media assets received from user devices with a same geographic location as the first cache server). This storing process would reduce the consumption of bandwidth later required to distribute media content associated with the first media asset from the origin server to the first cache server.

In some embodiments, subsequent to transmitting, from the first cache server, the media content with the first start-offset to the first user device, the system may copy a portion of a copy of the first media asset stored at the origin server to the first cache server. For example, the first start-offset may be a positive start-offset associated with a time before the start time of the first media asset. Accordingly, the system may initially transmit media content within the first start-offset to the first user device, responsive to receiving the request to access the first media asset, and may then retrieve media content associated with the first media asset from the origin server and route that to the first user device. This reduces the need to initially store the first media asset at the first cache server, but consumes bandwidth at the time of a request to access the first media asset is received. The system may store the portion of the copy of the first media asset at the first media asset (e.g., to a cache, RAMdisk, or hard disk). The system may transmit the portion of the copy of the first media asset from the first cache server to the first user device. For example, the system may transmit the portion of the copy of the first media asset to a user device using a network protocol.

In some embodiments, the system may, based on determining that the first location (e.g., of the first user device) and the second location (e.g., of the second user device) are not within the same geographic region, select the first cache server based on the first location of the first user device, and store media content within the first start-offset from the first media asset to the first cache server based on receiving the first request to store the first media asset. The system may select a second cache server based on the second location of the second user device, and store media content within the second start-offset from the first media asset to the second cache server based on receiving the second request to store the first media asset.

It should be noted that the systems, methods, apparatuses, and/or aspects described above may be applied to, or used in accordance with, other systems, methods, apparatuses, and/or aspects described in this disclosure.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 3 shows an illustrative example of a user-content table in accordance with some embodiments of the disclosure;

FIG. 4 shows an illustrative example of a content-hits table in accordance with some embodiments of the disclosure;

DETAILED DESCRIPTION

Figure 1:
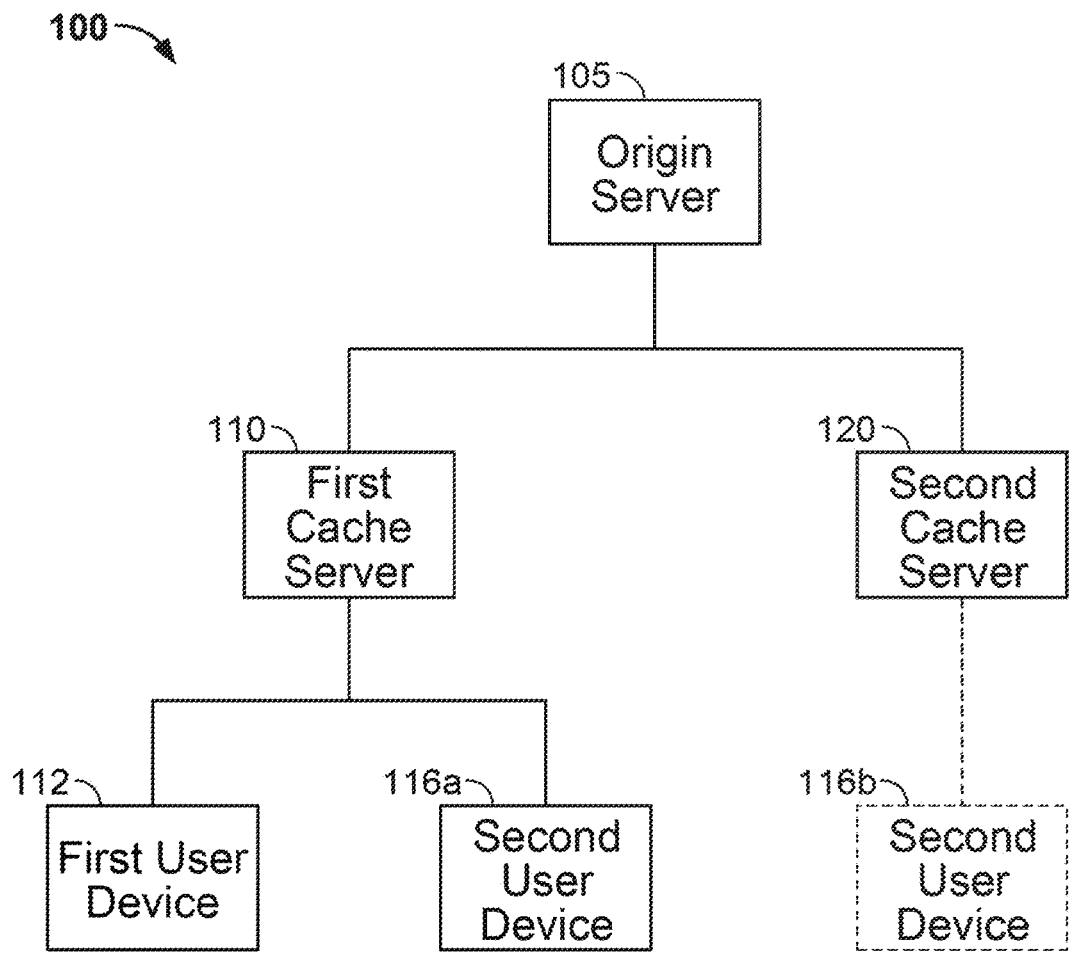
FIG. 1 shows an illustrative example of a content delivery network in accordance with some embodiments of the disclosure.

Systems and methods are described to address shortcomings in conventional media systems via a novel technique to record offsets in a network DVR system. The systems and methods may receive requests to records a media asset from multiple user devices associated with different users, and may determine a largest offset among the multiple requests to record the media asset. As referred to herein a request to record may also be understood to refer to a form of a request to store. The systems and methods may be implemented via an interactive media guidance application running on a user device, a remote server, or another suitable device. The interactive media guidance application may be implemented partially on multiple devices such that some portions of the interactive media guidance application are executed on one device while other portions of the interactive media guidance application are executed on another device.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

FIG. 1 shows an illustrative example of a content delivery network 100 in accordance with some embodiments of the disclosure. The content delivery network includes origin server 105, first cache server 110, second cache server 120, first user device, 112, and second user device 116a/116b. The origin server 105 maybe located at a content distribution facility (e.g., a television head-end, or within a cloud server or storage center). The first cache server 110 and the second cache server 120 may also be referred to as edge servers. The first cache server 110 may be located within a first geographic location, and the second cache server 120 may be located within a second geographic location, different from the first geographic location. The origin server 105 may be located in a third geographic location different from the first cache server 110, and the second cache server 120. In some embodiments, the first user device 112 and the second user device 116a may be coupled to the first cache server 110, when the first user device 112, the second user device 116a and the first cache server 110 are located within a same geographic location. In some embodiments, the first user device 112 may be coupled the first cache server 110, when the first user device 112 and the first cache server 110 are located within a same first geographic location, while the second user device 116b may be coupled to the second cache server 120, when the second user device 116b and the second cache server 120 are located within a second geographic location different from the first geographic location. The first user device 112 and the second user device 116a may be any user equipment device discussed below in reference to FIGS. 7 and 8. For example, the first user device 112 and the second user device 116a may be any of user television equipment 802, user computer equipment 804, and wireless user communications device 806.

Origin server 105, first cache server 110 and second cache server 120 may refer to any of media content source 816, or media guidance data source 818 or any combination thereof. Although one origin server and two cache servers have been illustrated, it should be understood that there may be multiple origin servers and multiple cache servers. For example, there may be one or more origin servers in a first geographic region that is coupled to a first set of cache servers, and there may be one or more origin servers in a second geographic region that is coupled to a second set of cache servers. There may be also be multiple tiers of cache servers (not shown). For example, there may be a first level of cache servers, and a second level of cache servers arranged in a hierarchy or cache servers.

In some embodiments, a system may store a copy of a first media asset, requested for recording by multiple user devices, at the first cache server 110 based on determining that a count of requests to store the first media asset exceeds a threshold. For example, the system may initially be configured to store a single copy the first media asset at the origin server, because the single copy at the origin server may be distributed to multiple cache servers. However, in order to exploit spatial locality, the system may store a copy of the first media asset at the first cache server, based on receiving multiple requests to store the first media asset from multiple user devices that are within a same geographic location as the first cache server, where the number exceeds a threshold (e.g., which may be a fixed number, or a percentage of total requests to store media assets received from user devices with a same geographic location as the first cache server 110). This storing process would reduce the consumption of bandwidth later required to distribute media content associated with the first media asset from the origin server to the first cache server.

Figure 2:
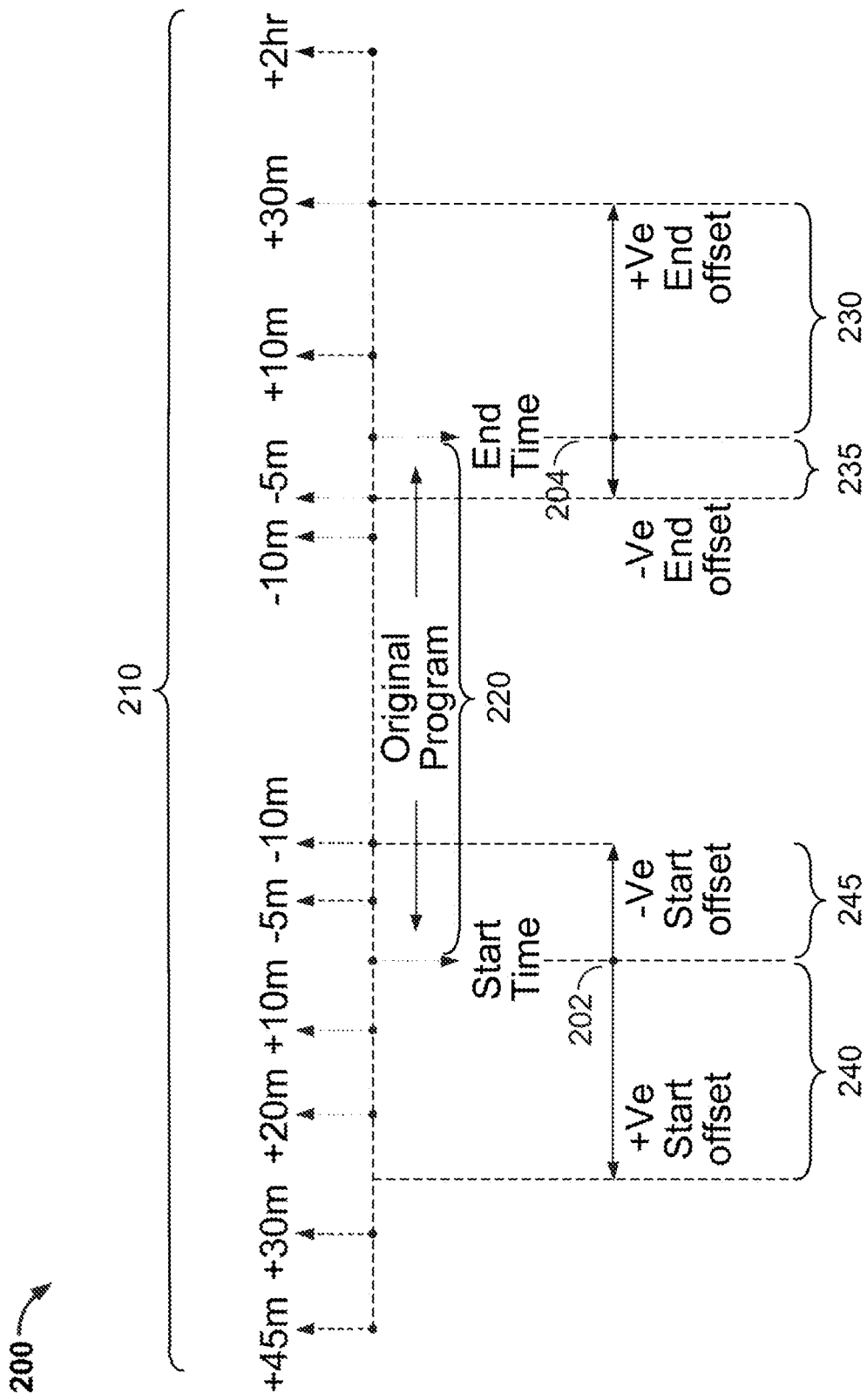
FIG. 2 shows an illustration of positive start offsets, negative start offsets, positive end offsets, and negative end offsets in accordance with some embodiments of the disclosure.

FIG. 2 shows an illustration of a timeline 200 of offsets 210, including positive start offsets, negative start offsets, positive end offsets, and negative end offsets in accordance with some embodiments of the disclosure. FIG. 2 includes a start time 202 of a media asset, an end time 204 of the media asset, and an interval 220 between the start time 202 and end time 204 representing the length of the media asset. FIG. 2 also illustrates a positive start-offset 240 from the start time 202, a negative start-offset 245 from the start time 202, a positive end-offset 235 from the end time 204, and a negative end-offset 230 from the end time 204 of the media asset. The positive start-offset 240 is associated with a time earlier than the start time 202 of the media asset. The negative start-offset 245 is associated with a later time than the start time 202 of the media asset. The negative end-offset 235 is associated with an earlier time than the end time 204 of the media asset. The positive end-offset 230 is associated with a later time than the end time 204 of the media asset. In some embodiments, the positive start-offset, negative end-offset, positive end-offset and negative end-offsets may correspond to an integer value, or floating point value, representing a number of minutes or seconds. In some embodiments, the positive start-offset, negative end-offset, positive end-offset and negative end-offsets may correspond to a set of preset values that increase in a linear relationship (e.g., −5, +5, +10), or non-linear relationship (e.g., −5, +5, +15, +40). The non-linear relationship may be useful to increase quickly increase the values at larger offset values.

FIG. 3 shows an illustrative example of a user-content table 300 in accordance with some embodiments of the disclosure. User-content table 300 may be stored in one or more of the servers illustrated in FIG. 1 (e.g., origin server 105, first cache server 110, and second cache server 120). User-content table 300 includes a plurality of entries 305, 310, 315, 320, that each correspond to a plurality of column 380, 350, 360, and 370. Each of the plurality of columns corresponds to a field. User-content table includes a user-id column 380, a content-id column 350, a start-offset column 360, and an end-offset 370. Each of the entries of the user-content table includes fields corresponding to columns 380, 350, 360, and 370. A user-id may be any of a user name, a hash code of the user name, and/or an identifier of a user device. A content-id may be a portion of or any combination of guidance data related to a media asset discussed below, a hash code of the guidance data, any combination thereof, or any other suitable media asset identifier. A start-offset may be an integer, a code, or a number of minutes, corresponding to any of the positive start-offset 240 or negative start-offset 245, discussed above in reference to FIG. 2. An end-offset may be an integer, a code, or a number of minutes corresponding to any of the positive end-offset 230, or negative end-offset 235, discussed above in reference to FIG. 2.

A first user entry 305 may include a first user-id 380a, a first content-id 350a for a media asset, a first start-offset 360a, and a first end-offset 370a. A second user entry 310, may include a second user-id 380b, a second content-id 350b for a media asset, a second start-offset 360b, and a second end-offset 370b. A third user entry 315, may include a third user-id 380c, a third content-id 350c for a media asset, a third start-offset 360c, and a third end-offset 370c. A fourth user entry 320, may include a fourth user-id 380d, a fourth content-id 350d for a media asset, a fourth start-offset 360d, and a fourth end-offset 370d.

In some embodiments, each of entries 305, 310, 315, and 320 may be used to track a request to record a media asset, based on a distinction combination of a user-id and a content-id. For example, if a request to record a first media asset is received from a first user device associated with the first user, and a request to record a second media asset is received from the first user device associated with the first user, then a system would create two entries within user-content table 300, for each of the requests.

In some embodiments, as illustrated in FIG. 3, each of the entries 305, 310, 315, and 320 may correspond to a different user (e.g., user A, user B, user C, and user D), whereas the content-id may correspond to a program (e.g., program P1). In some embodiments, the content-id of each entry may be different, corresponding to different programs. The start-offsets 360a, 360b, 360c, 360d of the entries 305, 310, 315, and 320, respectively, may be the same or different. The end-offsets 370a, 370b, 370c, and 370d of the entries 305, 310, 315, and 320, respectively, may be the same or different.

In some embodiments, the offsets of may be limited to a portion of an adjacent media asset in order to comply with copyright regulations. For example, control circuitry 704 may receive a request to record a media asset with a first start-offset, and/or a first end-offset. Control circuitry 704 may retrieve media guidance data (e.g., from media guidance data source 818), and determine whether a start-offset and/or end-offset (e.g., +60 of an end-offset) would encompass a broadcast duration of an adjacent program (e.g., if a subsequent program has as broadcast interval of 30 minutes, it would be encompassed by the +60 end-offset). Based on determining that the start-offset or end-offset would encompass another program, the control circuitry may cause an notification message to be displayed. In some embodiments, control circuitry may limit the range of selectable offsets around a particular media asset, selected for storing by a user.

FIG. 4 shows an illustrative example of a content-hits table 400 in accordance with some embodiments of the disclosure. Content-hits table 400 may be stored in one or more of the servers illustrated in FIG. 1 (e.g., origin server 105, first cache server 110, and second cache server 120). Content-hits table 400 may include a plurality of entries, although a single entry 405 has been illustrated, that each corresponds to a media asset. Content-hits table 400 includes a plurality of columns 450, 460, 470, and 480. Each of the plurality of columns corresponds to a field. Content-hits table 400 includes a content-id column 450, a largest start-offset column 460, a largest end-offset column 470, and a hits column 480. Each of the entries of the content-hits table 400 includes fields corresponding to columns 450, 460, 470, and 480. For example, entry 405 includes a content-id field 450a, largest start-offset field 460a, largest end-offset field 470a and hits field 480a.

A content-id may be the same as the content-id discussed above in reference to FIG. 3. For example, content-id field 450a of entry 405 may correspond to a media asset P1, and have the same content-id as content-id fields 350a, 350b, 350c, and 350d of FIG. 3. A largest start-offset may correspond to a largest start-offset from among the entries corresponding to a media asset associated with a content-id. For example, the largest offset field 460a for entry 405 associated with media asset P1 may be +40 (e.g., 40 minutes before a start time of P1), which corresponds to start-offset 360d from FIG. 3. A largest end-offset may correspond to a largest end-offset from among the entries corresponding to a media asset associated with a content-id. For example, the largest end-offset field 470a associated with a media asset P1 may be +60 (e.g., 60 minutes after an end time of P1), which corresponds to end-offset 370c from FIG. 3. A hits (e.g., hits field 480a), corresponds to a count of a number of requests to record a media asset (e.g., P1). For example, hits field 480a may correspond to 4, a count of the number of requests to record media asset P1, which may correspond to a number of entries associated with a content-id associated with P1, from FIG. 3.

The content-hits table may be pre-populated with information for each broadcast, or may be populated upon receiving a request to store a program. For example, based on receiving the first request to store the first media asset, the system may determine whether the content-hits table already includes an entry associated with the first media asset (e.g., by querying a database that stores the content-hits table based on a unique ID for the first media asset).

Figure 5:
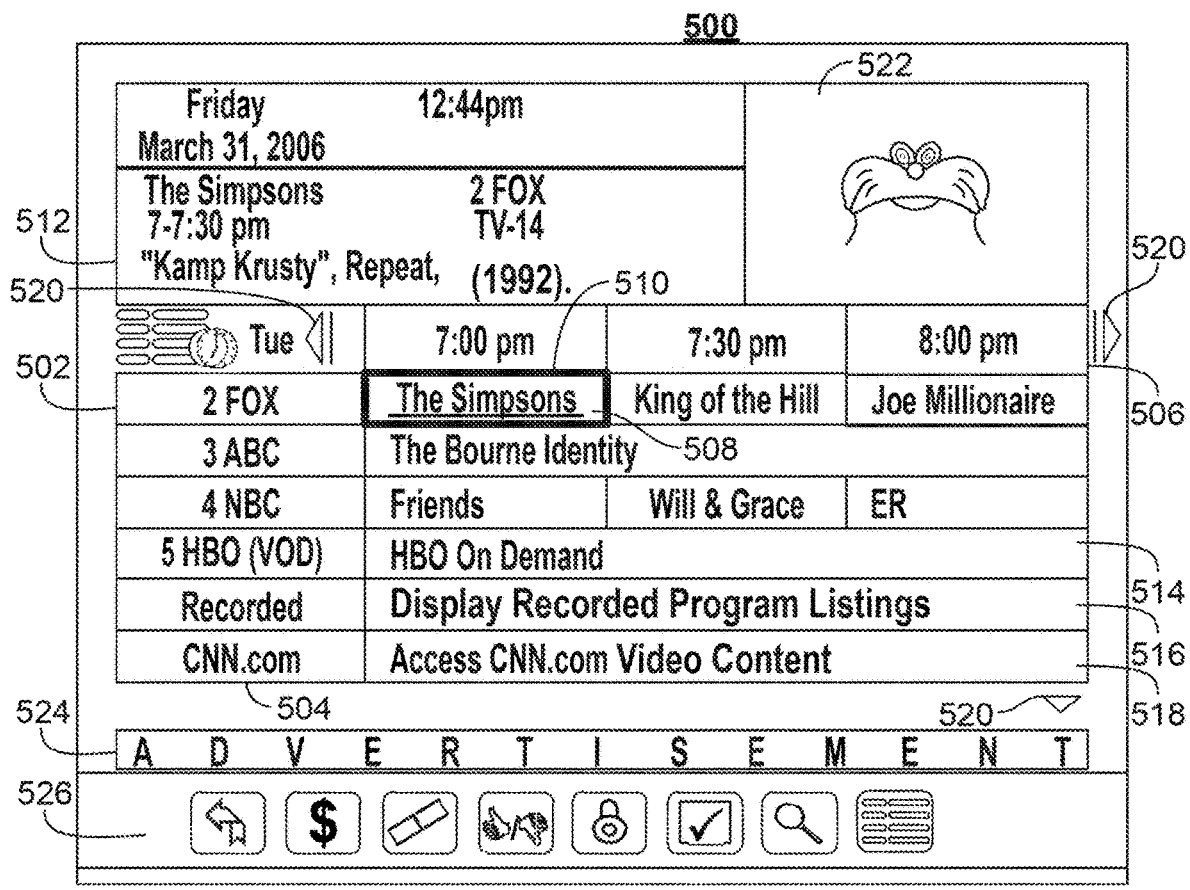
FIG. 5 shows an illustrative example of a display screen generated by a media guidance application in accordance with some embodiments of the disclosure.
Figure 6:
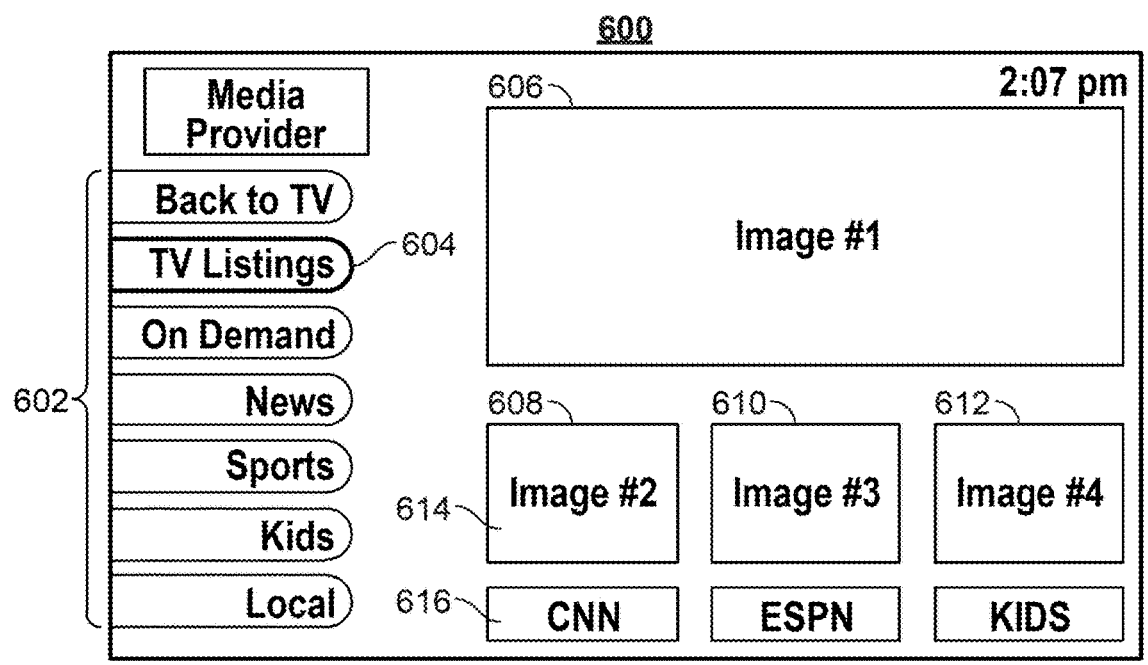
FIG. 6 shows another illustrative example of a display screen generated by a media guidance application in accordance with some embodiments of the disclosure.

FIGS. 5-6 show illustrative display screens that may be used to provide media guidance data. The display screens shown in FIGS. 5-6 may be implemented on any suitable user equipment device or platform. While the displays of FIGS. 5-6 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 5 shows illustrative grid of a program listings display 500 arranged by time and channel that also enables access to different types of content in a single display. Display 500 may include grid 502 with: (1) a column of channel/content type identifiers 504, where each channel/content type identifier (which is a cell in the column) identifies a different channel or content type available; and (2) a row of time identifiers 506, where each time identifier (which is a cell in the row) identifies a time block of programming. Grid 502 also includes cells of program listings, such as program listing 508, where each listing provides the title of the program provided on the listing's associated channel and time. With a user input device, a user can select program listings by moving highlight region 510. Information relating to the program listing selected by highlight region 510 may be provided in program information region 512. Region 512 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP). In some embodiments, control circuitry 704 (e.g., of a user device and/or server as described in FIG. 7 and FIG. 8 below) may generate for display a chat option in media guidance applications of each user associated with a request to store a same media asset (e.g., a sports game scheduled to air at 8 PM). For example, control circuitry 704 may issue a query to a database that stores a user-content table, to retrieve all user-ids associated with a content-id or other identifier of a media asset requested for recording. Control circuitry 704 may then generate a chat session and generate for display, the chat option in the media guidance applications of each user associated with the request to store the media asset. Control circuitry 704 may generate for display the chat option after the broadcast of the media asset requested for recording has started. In some embodiments, control circuitry 704 may analyze social media trends associated with the media asset requested for recording and generate for display the chat option after the trending associated with the first media asset has exceeded a threshold.

Grid 502 may provide media guidance data for non-linear programming including on-demand listing 514, recorded content listing 516, and Internet content listing 518. A display combining media guidance data for content from different types of content sources is sometimes referred to as a "mixed-media" display. Various permutations of the types of media guidance data that may be displayed that are different than display 500 may be based on user selection or guidance application definition (e.g., a display of only recorded and broadcast listings, only on-demand and broadcast listings, etc.). As illustrated, listings 514, 516, and 518 are shown as spanning the entire time block displayed in grid 502 to indicate that selection of these listings may provide access to a display dedicated to on-demand listings, recorded listings, or Internet listings, respectively. In some embodiments, listings for these content types may be included directly in grid 502. Additional media guidance data may be displayed in response to the user selecting one of the navigational icons 520. (Pressing an arrow key on a user input device may affect the display in a similar manner as selecting navigational icons 520.)

Display 500 may also include video region 522, and options region 526. Video region 522 may allow the user to view and/or preview programs that are currently available, will be available, or were available to the user. The content of video region 522 may correspond to, or be independent from, one of the listings displayed in grid 502. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 526 may allow the user to access different types of content, media guidance application displays, and/or media guidance application features. Options region 526 may be part of display 500 (and other display screens described herein), or may be invoked by a user by selecting an on-screen option or pressing a dedicated or assignable button on a user input device. The selectable options within options region 526 may concern features related to program listings in grid 502 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 8. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 6. Video mosaic display 600 includes selectable options 602 for content information organized based on content type, genre, and/or other organization criteria. In display 600, television listings option 604 is selected, thus providing listings 606, 608, 610, and 612 as broadcast program listings. In display 600 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 608 may include more than one portion, including media portion 614 and text portion 616. Media portion 614 and/or text portion 616 may be selectable to view content in full-screen or to view information related to the content displayed in media portion 614 (e.g., to view listings for the channel that the video is displayed on).

The listings in display 600 are of different sizes (i.e., listing 606 is larger than listings 608, 610, and 612), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 7:
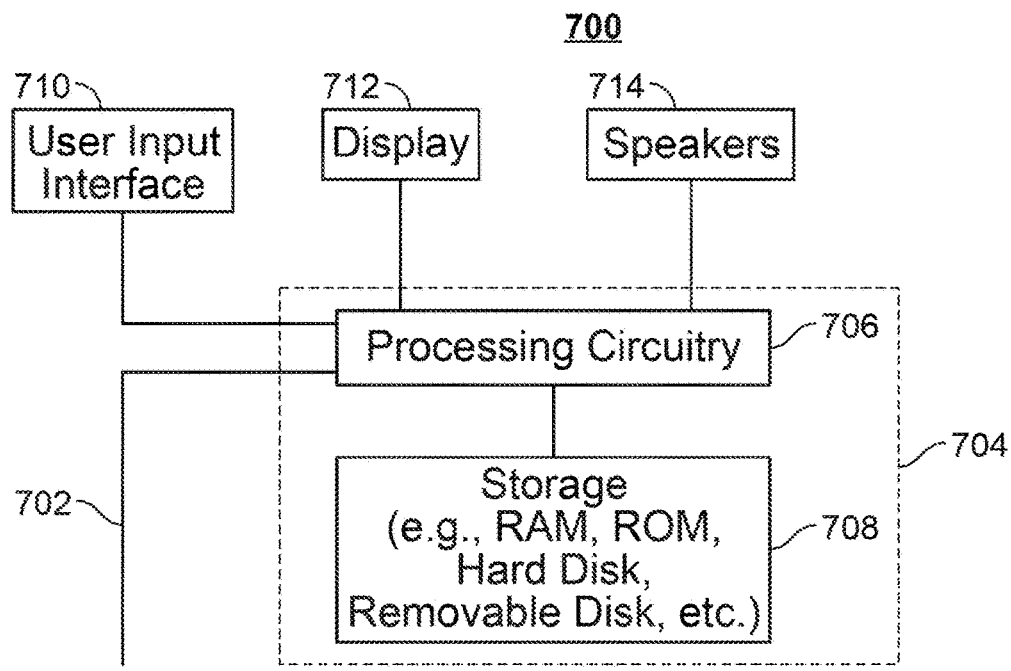
FIG. 7 is a block diagram of an illustrative user equipment device in accordance with some embodiments of the disclosure.

Users may access content and the media guidance application (and its display screens described above and below) from one or more of their user equipment devices. FIG. 7 shows a generalized embodiment of illustrative user equipment device 700. More specific implementations of user equipment devices are discussed below in connection with FIG. 8. User equipment device 700 may receive content and data via input/output (hereinafter "I/O") path 702. I/O path 702 may provide content (e.g., broadcast programming, on-demand programming, Internet content, content available over a local area network (LAN) or wide area network (WAN), and/or other content) and data to control circuitry 704, which includes processing circuitry 706 and storage 708. Control circuitry 704 may be used to send and receive commands, requests, and other suitable data using I/O path 702. I/O path 702 may connect control circuitry 704 (and specifically processing circuitry 706) to one or more communications paths (described below). I/O functions may be provided by one or more of these communications paths, but are shown as a single path in FIG. 7 to avoid overcomplicating the drawing.

Control circuitry 704 may be based on any suitable processing circuitry such as processing circuitry 706. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 704 executes instructions for a media guidance application stored in memory (i.e., storage 708). Specifically, control circuitry 704 may be instructed by the media guidance application to perform the functions discussed above and below. For example, the media guidance application may provide instructions to control circuitry 704 to generate the media guidance displays. In some implementations, any action performed by control circuitry 704 may be based on instructions received from the media guidance application.

In client-server based embodiments, control circuitry 704 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 8). In addition, communications circuitry may include circuitry that enables peer-to-peer communication of user equipment devices, or communication of user equipment devices in locations remote from each other (described in more detail below).

Memory may be an electronic storage device provided as storage 708 that is part of control circuitry 704. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 708 may be used to store various types of content described herein as well as media guidance data described above. Nonvolatile memory may also be used (e.g., to launch a boot-up routine and other instructions). Cloud-based storage, described in relation to FIG. 8, may be used to supplement storage 708 or instead of storage 708.

Control circuitry 704 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 704 may also include scaler circuitry for upconverting and downconverting content into the preferred output format of the user equipment 700. Circuitry 704 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 708 is provided as a separate device from user equipment 700, the tuning and encoding circuitry (including multiple tuners) may be associated with storage 708.

A user may send instructions to control circuitry 704 using user input interface 710. User input interface 710 may be any suitable user interface, such as a remote control, mouse, trackball, keypad, keyboard, touch screen, touchpad, stylus input, joystick, voice recognition interface, or other user input interfaces. Display 712 may be provided as a stand-alone device or integrated with other elements of user equipment device 700. For example, display 712 may be a touchscreen or touch-sensitive display. In such circumstances, user input interface 710 may be integrated with or combined with display 712. Display 712 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 712 may be HDTV-capable. In some embodiments, display 712 may be a 3D display, and the interactive media guidance application and any suitable content may be displayed in 3D. A video card or graphics card may generate the output to the display 712. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 704. The video card may be integrated with the control circuitry 704. Speakers 714 may be provided as integrated with other elements of user equipment device 700 or may be stand-alone units. The audio component of videos and other content displayed on display 712 may be played through speakers 714. In some embodiments, the audio may be distributed to a receiver (not shown), which processes and outputs the audio via speakers 714.

The guidance application may be implemented using any suitable architecture. For example, it may be a stand-alone application wholly-implemented on user equipment device 700. In such an approach, instructions of the application are stored locally (e.g., in storage 708), and data for use by the application is downloaded on a periodic basis (e.g., from an out-of-band feed, from an Internet resource, or using another suitable approach). Control circuitry 704 may retrieve instructions of the application from storage 708 and process the instructions to generate any of the displays discussed herein. Based on the processed instructions, control circuitry 704 may determine what action to perform when input is received from input interface 710. For example, movement of a cursor on a display up/down may be indicated by the processed instructions when input interface 710 indicates that an up/down button was selected.

In some embodiments, the media guidance application is a client-server based application. Data for use by a thick or thin client implemented on user equipment device 700 is retrieved on-demand by issuing requests to a server remote to the user equipment device 700. In one example of a client-server based guidance application, control circuitry 704 runs a web browser that interprets web pages provided by a remote server. For example, the remote server may store the instructions for the application in a storage device. The remote server may process the stored instructions using circuitry (e.g., control circuitry 704) and generate the displays discussed above and below. The client device may receive the displays generated by the remote server and may display the content of the displays locally on equipment device 700. This way, the processing of the instructions is performed remotely by the server while the resulting displays are provided locally on equipment device 700. Equipment device 700 may receive inputs from the user via input interface 710 and transmit those inputs to the remote server for processing and generating the corresponding displays. For example, equipment device 700 may transmit a communication to the remote server indicating that an up/down button was selected via input interface 710. The remote server may process instructions in accordance with that input and generate a display of the application corresponding to the input (e.g., a display that moves a cursor up/down). The generated display is then transmitted to equipment device 700 for presentation to the user.

In some embodiments, the media guidance application is downloaded and interpreted or otherwise run by an interpreter or virtual machine (run by control circuitry 704). In some embodiments, the guidance application may be encoded in the ETV Binary Interchange Format (EBIF), received by control circuitry 704 as part of a suitable feed, and interpreted by a user agent running on control circuitry 704. For example, the guidance application may be an EBIF application. In some embodiments, the guidance application may be defined by a series of JAVA-based files that are received and run by a local virtual machine or other suitable middleware executed by control circuitry 704. In some of such embodiments (e.g., those employing MPEG-2 or other digital media encoding schemes), the guidance application may be, for example, encoded and transmitted in an MPEG-2 object carousel with the MPEG audio and video packets of a program.

Figure 8:
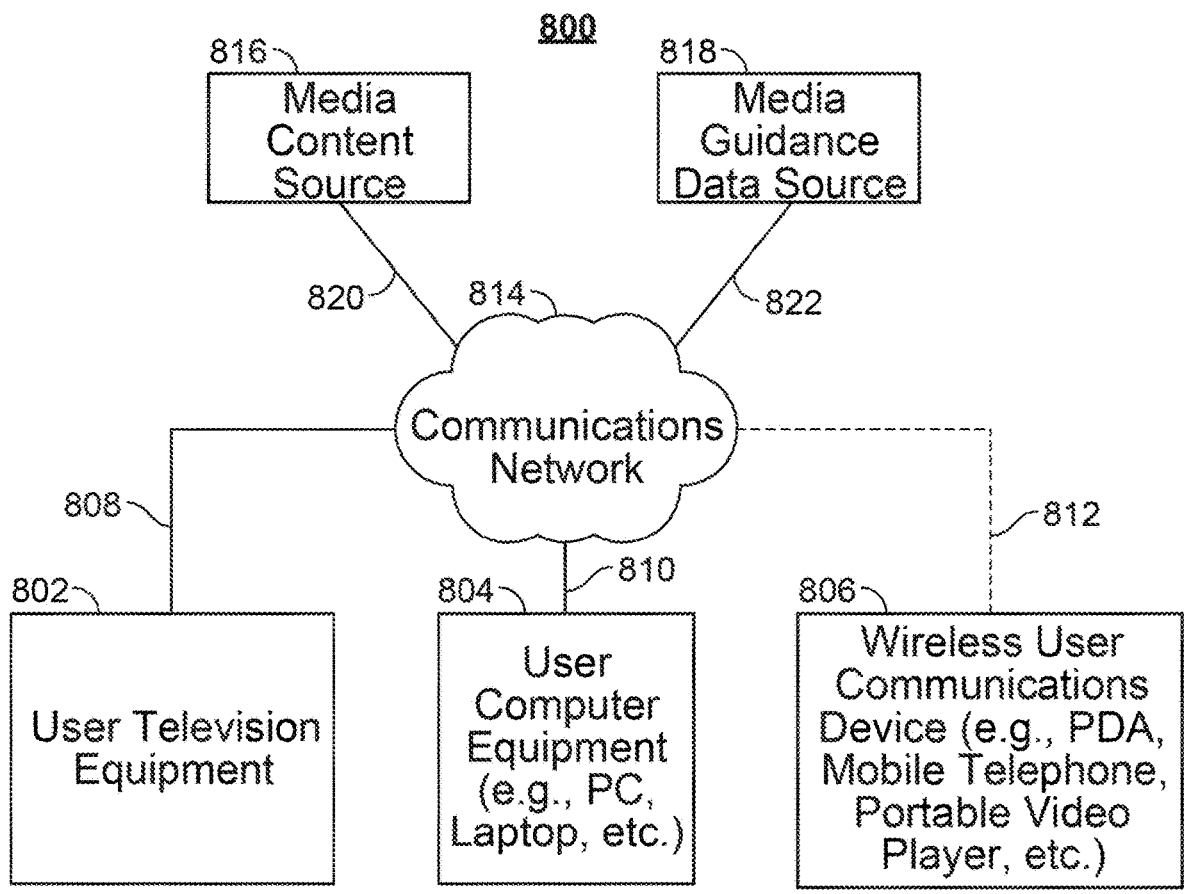
FIG. 8 is a block diagram of an illustrative media system in accordance with some embodiments of the disclosure.

User equipment device 700 of FIG. 7 can be implemented in system 800 of FIG. 8 as user television equipment 802, user computer equipment 804, wireless user communications device 806, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 7 may not be classified solely as user television equipment 802, user computer equipment 804, or a wireless user communications device 806. For example, user television equipment 802 may, like some user computer equipment 804, be Internet-enabled allowing for access to Internet content, while user computer equipment 804 may, like some television equipment 802, include a tuner allowing for access to television programming. The media guidance application may have the same layout on various different types of user equipment or may be tailored to the display capabilities of the user equipment. For example, on user computer equipment 804, the guidance application may be provided as a web site accessed by a web browser. In another example, the guidance application may be scaled down for wireless user communications devices 806.

In system 800, there is typically more than one of each type of user equipment device but only one of each is shown in FIG. 8 to avoid overcomplicating the drawing. In addition, each user may utilize more than one type of user equipment device and also more than one of each type of user equipment device.

In some embodiments, a user equipment device (e.g., user television equipment 802, user computer equipment 804, wireless user communications device 806) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 814. Namely, user television equipment 802, user computer equipment 804, and wireless user communications device 806 are coupled to communications network 814 via communications paths 808, 810, and 812, respectively. Communications network 814 may be one or more networks including the Internet, a mobile phone network, mobile voice or data network (e.g., a 4G or LTE network), cable network, public switched telephone network, or other types of communications network or combinations of communications networks. Paths 808, 810, and 812 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 812 is drawn with dotted lines to indicate that in the exemplary embodiment shown in FIG. 8 it is a wireless path and paths 808 and 810 are drawn as solid lines to indicate they are wired paths (although these paths may be wireless paths, if desired). Communications with the user equipment devices may be provided by one or more of these communications paths, but are shown as a single path in FIG. 8 to avoid overcomplicating the drawing.

Although communications paths are not drawn between user equipment devices, these devices may communicate directly with each other via communication paths, such as those described above in connection with paths 808, 810, and 812, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 814.

System 800 includes content source 816 and media guidance data source 818 coupled to communications network 814 via communication paths 820 and 822, respectively. Paths 820 and 822 may include any of the communication paths described above in connection with paths 808, 810, and 812. Communications with the content source 816 and media guidance data source 818 may be exchanged over one or more communications paths, but are shown as a single path in FIG. 8 to avoid overcomplicating the drawing. In addition, there may be more than one of each of content source 816 and media guidance data source 818, but only one of each is shown in FIG. 8 to avoid overcomplicating the drawing. (The different types of each of these sources are discussed below.) If desired, content source 816 and media guidance data source 818 may be integrated as one source device. Although communications between sources 816 and 818 with user equipment devices 802, 804, and 806 are shown as through communications network 814, in some embodiments, sources 816 and 818 may communicate directly with user equipment devices 802, 804, and 806 via communication paths (not shown) such as those described above in connection with paths 808, 810, and 812.

Content source 816 may include one or more types of content distribution equipment including a television distribution facility, cable system headend, satellite distribution facility, programming sources (e.g., television broadcasters, such as NBC, ABC, HBO, etc.), intermediate distribution facilities, a content distribution network (e.g., as illustrated in FIG. 1) and/or servers (e.g., origin server 105, first cache server 110, second cache server 120 of FIG. 1), Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 816 may be the originator of content (e.g., a television broadcaster, a Webcast provider, etc.) or may not be the originator of content (e.g., an on-demand content provider, an Internet provider of content of broadcast programs for downloading, etc.). Content source 816 may include cable sources, satellite providers, on-demand providers, Internet providers, over-the-top content providers, or other providers of content. Content source 816 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety. Content source 816 may include components such as control circuitry 704, which includes processing circuitry 706, and storage 708, as illustrated and discussed above in reference to FIG. 7.

Media guidance data source 818 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 818 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 818 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 818 may provide user equipment devices 802, 804, and 806 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 708, and executed by control circuitry 704 of a user equipment device 700. In some embodiments, media guidance applications may be client-server applications where only a client application resides on the user equipment device, and server application resides on a remote server. For example, media guidance applications may be implemented partially as a client application on control circuitry 704 of user equipment device 700 and partially on a remote server as a server application (e.g., media guidance data source 818) running on control circuitry of the remote server. When executed by control circuitry of the remote server (such as media guidance data source 818), the media guidance application may instruct the control circuitry to generate the guidance application displays and transmit the generated displays to the user equipment devices. The server application may instruct the control circuitry of the media guidance data source 818 to transmit data for storage on the user equipment. The client application may instruct control circuitry of the receiving user equipment to generate the guidance application displays.

Content and/or media guidance data delivered to user equipment devices 802, 804, and 806 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 800 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 8.

In one approach, user equipment devices may communicate with each other within a home network. User equipment devices can communicate with each other directly via short-range point-to-point communication schemes described above, via indirect paths through a hub or other similar device provided on a home network, or via communications network 814. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a web site via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 816 to access content. Specifically, within a home, users of user television equipment 802 and user computer equipment 804 may access the media guidance application to navigate among and locate desirable content. Users may also access the media guidance application outside of the home using wireless user communications devices 806 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 814. These cloud resources may include one or more content sources 816 and one or more media guidance data sources 818. In addition or in the alternative, the remote computing sites may include other user equipment devices, such as user television equipment 802, user computer equipment 804, and wireless user communications device 806. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 804 or wireless user communications device 806 having content capture feature. Alternatively, the user can first transfer the content to a user equipment device, such as user computer equipment 804. The user equipment device storing the content uploads the content to the cloud using a data transmission service on communications network 814. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 7.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

FIGS. 9-12 present processes for control circuitry (e.g., control circuitry 704) to record offsets of a first media asset, and determine a largest start-offset and/or largest-end offset from the first media asset in accordance with some embodiments of the disclosure. In some embodiments this algorithm may be encoded on to non-transitory storage medium (e.g., storage device 708 of a user device or server) as a set of instructions to be decoded and executed by processing circuitry (e.g., processing circuitry 706 of a user device or server). Processing circuitry 706 may in turn provide instructions to other sub-circuits contained within control circuitry 704, such as tuning, video generating, encoding, decoding, encrypting, decrypting, scaling, analog/digital conversion circuitry, and the like.

Figure 9:
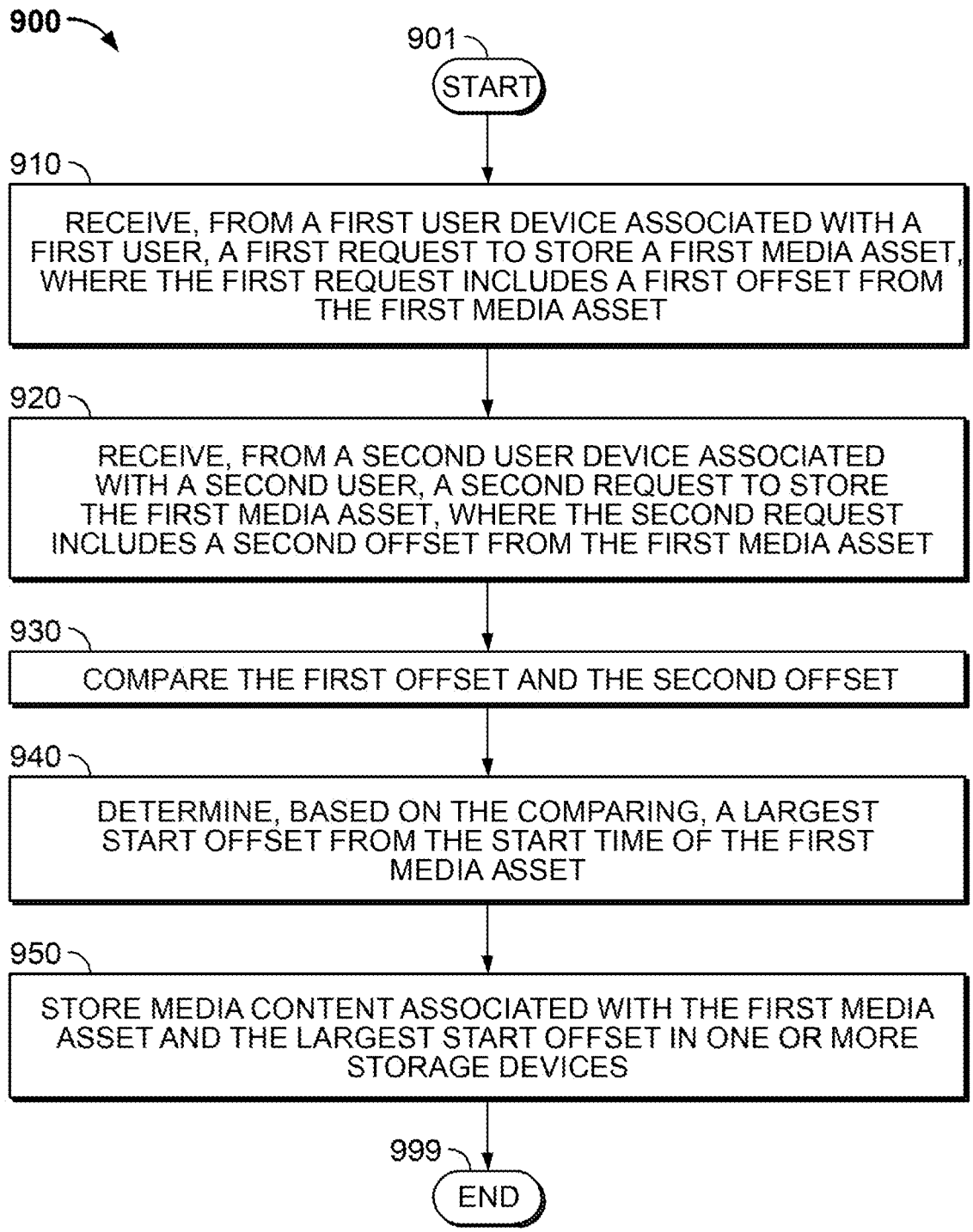
FIG. 9 is a flowchart of an illustrative process for recording offsets of a first media asset in accordance with some embodiments of the disclosure.

FIG. 9 is a flowchart of an illustrative process 900 for recording offsets of a first media asset in accordance with some embodiments of the disclosure. At step 910, control circuitry 704 (e.g., of a server such as origin server 105, first cache server 110, second cache server 120, a media content source 816, or other server), receives from a first user device (e.g., a user device 700) associated with a first user, a first request (e.g., a command) to store a first media asset, where the first request includes a first offset from the first media asset. In some embodiments, the first offset may be a positive start-offset 240 or negative start-offset 245. In some embodiments, the first offset may be a negative end-offset 235 or a positive end-offset 230. For example, the control circuitry 704 of an origin server 105, or a cache server (e.g., within media content source 816) may receive the request from any of user devices 802, 804, 806, that was received from a media guidance application (e.g., from display 500 of FIG. 5 or 600 of FIG. 6). For example, the control circuitry 704 may receive a command from a first user device (e.g., a user device associated with user C, corresponding to entry 315 of FIG. 3), based on a selection, at the first user device, of a program listing for a sports program (e.g., any of the program listings in FIGS. 5 and 6), that is scheduled to start broadcasting at 8 PM. The command may include the user-id 380c, content-id 350c, start-offset 360c (e.g., +30), and/or end-offset 370c (+60).

At step 920, control circuitry 704 (e.g., of a server such as origin server 105, first cache server 110, second cache server 120, a media content source 816, or other server), receives from a second user device (e.g., a user device 700) associated with a second user, a second request (e.g., a command) to store the first media asset, where the second request includes a second offset from the first media asset. In some embodiments, the second offset may be a positive start-offset 240 or negative start-offset 245. In some embodiments, the second offset may be a negative end-offset 235 or a positive end-offset 230. For example, the control circuitry 704 of an origin server 105, or a cache server (e.g., within media content source 816) may receive the request from any of user devices 802, 804, 806, that was received from a media guidance application (e.g., from display 500 of FIG. 5 or 600 of FIG. 6). For example, the control circuitry 704 may receive a command from a second user device (e.g., a user device associated with user D, corresponding to entry 320 of FIG. 3), based on a selection, at the second user device, of a program listing for the sports program (e.g., any of the program listings in FIGS. 5 and 6), that is scheduled to start broadcasting at 8 PM. The command may include the user-id 380d, content-id 350d, start-offset 360d (e.g., +40), and/or end-offset 370d (e.g., 0-offset).

At step 930, control circuitry 704 (e.g., of a server such as origin server 105, first cache server 110, second cache server 120, a media content source 816, or other server), may compare the first offset and the second offset. For example, control circuitry 704 may compare the first offset and the second offset using microcode in a microprocessor (e.g., by comparing a variable for the first offset, and a variable for the second offset), or may compare the first offset and the second offset in hardware (e.g., by using a comparator). For example, the first offset may be a positive start-offset (e.g., +30, corresponding to field 360c for user C), and the second start-offset may be a positive start-offset (e.g., +40, corresponding to field 360d for user D). Control circuitry may compare the first start-offset (e.g., +30) with the second start-offset (e.g., +40).

At step 940, control circuitry 704 (e.g., of a server such as origin server 105, first cache server 110, second cache server 120, a media content source 816, or other server), may determine, based on the comparing (e.g., of step 930), a largest start-offset from the start time of the first media asset. For example, control circuitry 704 may determine that the second offset (e.g., +40) is the largest start offset.

At step 950, control circuitry 704 (e.g., of a server such as origin server 105, first cache server 110, second cache server 120, a media content source 816, or other server), may store media content associated with the first media asset and the largest start-offset in or more storage devices. In a shared copy network DVR, control circuitry 704, may direct origin server 105 and/or a cache server to record the first media asset and media content associated with the largest offset. For example, control circuitry 704 may compute a start time for recording as based on the largest start-offset (e.g., +40), and the start time of the first media asset (e.g., 8 PM), as 7:20 pm. Control circuitry 704 may direct origin server 110 and/or a cache server to schedule a recording of a broadcast from a source of the first media asset at 7:20 pm to storage 708, such that the media content associated with the largest offset (e.g., +40) is recorded along with the first media asset (e.g., the program having a start time at 8 PM). In some embodiments, the media asset may already be stored in one more storage devices (e.g., at the origin server, cache server, or other suitable server). For example, the media asset may already be stored from a prior broadcast of the media asset. In these embodiments, control circuitry 704 may store media content associated with the start-offset and/or end-offsets In some embodiments, the media asset may be partially stored. For example, the request to record the program may be received while the broadcast of the first media asset is in progress. Control circuitry 704 may store the remaining media content of the broadcast of the first media asset, and may copy the media content for the earlier portion of the first media asset from another stored copy. Control circuitry 704 may then store media content associated with the requested end-offsets and/or the start-offsets. The processes of step 950 may also include the processed described further below in reference to step 1075.

It is contemplated that the descriptions of FIG. 9 may be used with any other embodiment of this disclosure. In addition, the descriptions described in relation to the algorithm of FIG. 9 may be done in alternative orders or in parallel to further the purposes of this disclosure. As a further example, in some embodiments, several steps may be evaluated in parallel, using multiple logical processor threads, or the algorithm may be enhanced by incorporating branch prediction. Furthermore, it should be noted that the process of FIG. 9 may be implemented on a combination of appropriately configured software and hardware, and that any of the devices or equipment discussed in relation to FIGS. 7-8 could be used to implement one or more portions of the process.

Figure 10:
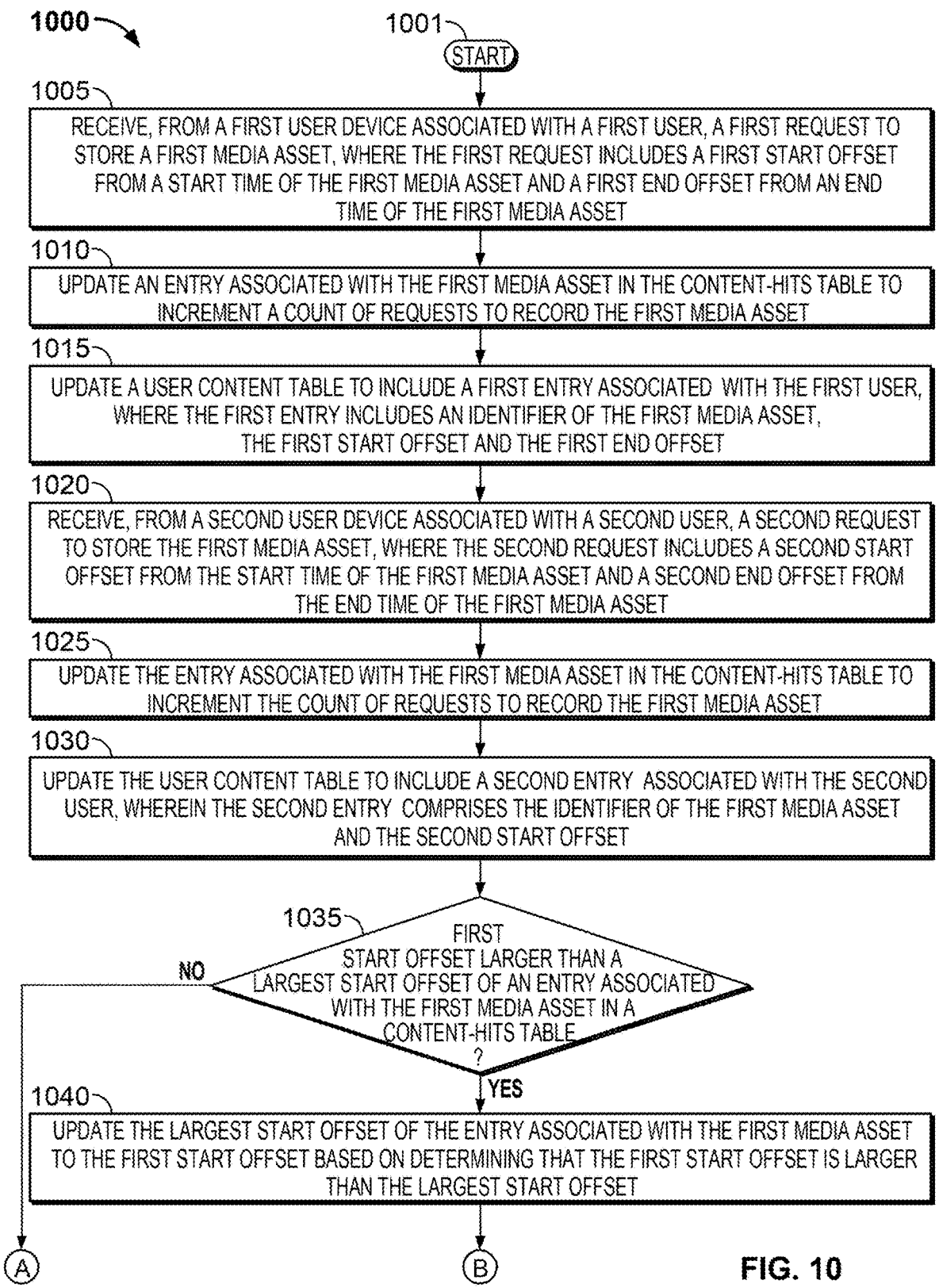
FIG. 10 is a flowchart of a detailed illustrative process for recordings offsets of a first media asset in accordance with some embodiments of the disclosure.
Figure 10:
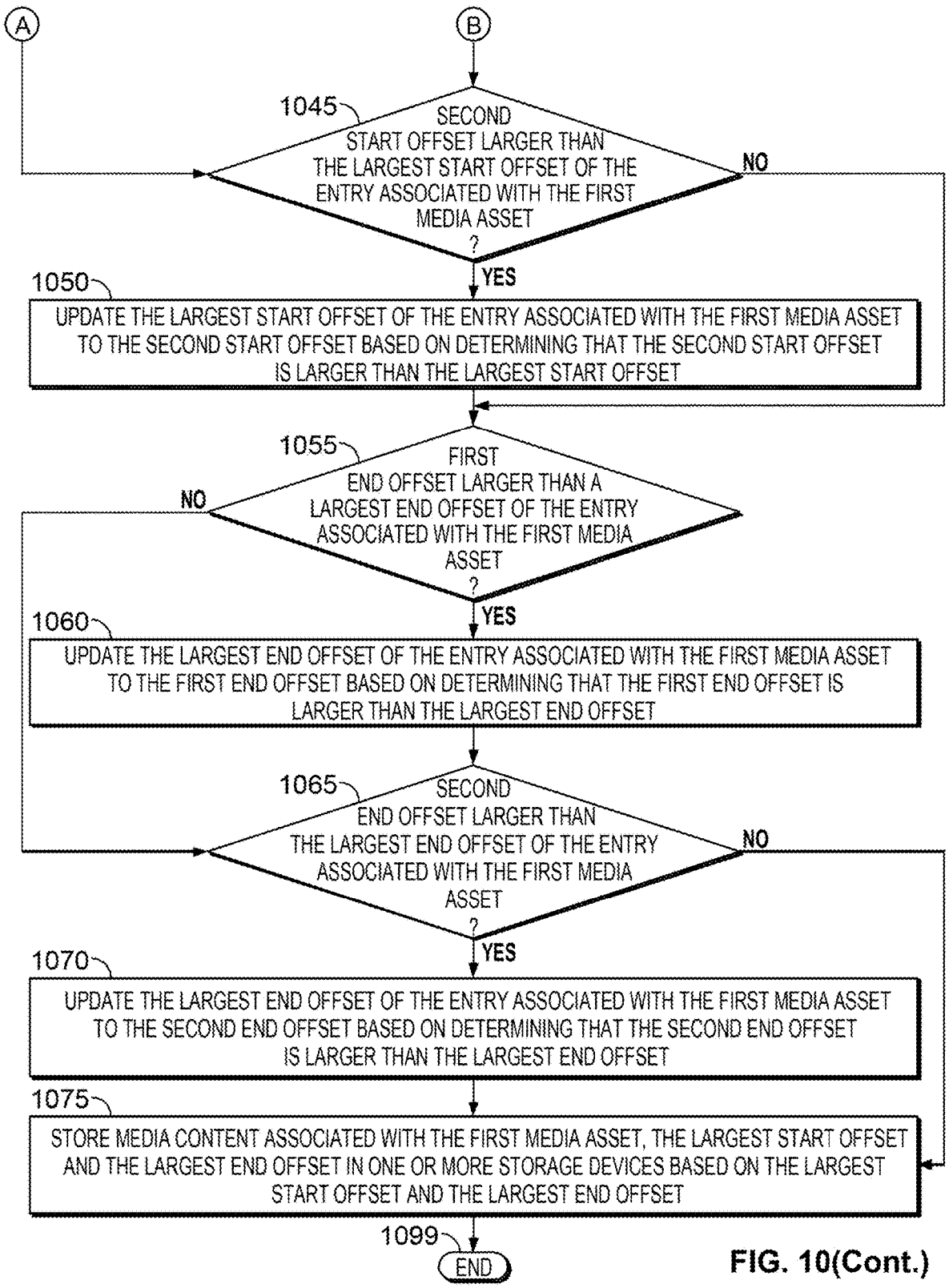

FIG. 10 is a flowchart of a detailed illustrative process for recordings offsets of a first media asset in accordance with some embodiments of the disclosure. At step 1005, control circuitry 704 (e.g., of a server such as origin server 105, first cache server 110, second cache server 120, a media content source 816, or other server), may receive from a first user device (e.g., a user device 700 of FIG. 7), associated with a first user (e.g., user C of FIG. 3), a first request to store a first media asset (e.g., a sports program having a start time of 8 PM and end time of 10 PM, scheduled for broadcast on channel 5), where the first request includes a first start-offset (e.g., +30, corresponding to start-offset 360c of FIG. 3) from a start time (e.g., 8 PM) of the first media asset, and a first end-offset (e.g., +60) from an end time (e.g., 10 PM) of the first media asset. For example, control circuitry 704 (e.g., within a content distribution network) may receive the command based on a user selection of a program listing for the first media asset (e.g., the sports program having a start time of 8 PM and end time of 10 PM, scheduled for broadcast on channel 5).

At step 1010, control circuitry 704 may update the entry (e.g., entry 405) associated with the first media asset in the content hits table (e.g., content hits table 400 of FIG. 4) to increment a count of requests (e.g., hits 480a) to record the first media asset. For example, control circuitry 704 may issue an update command to a database (e.g., stored on storage 706 of the same or different server) which stores the content-hits table to increment the count of requests from 2 to 3 (e.g., assuming requests for storing the first media asset were previously received from users A and B of user-content table 300). For example, control circuitry 704, may issue a command to the database to retrieve the count of requests (e.g., hits 480a), increment the count of requests, and then issue a command to the database to write-back the incremented count of requests to the entry (e.g., entry 405).

At step 1015, control circuitry 704 may update a user content table (e.g., user-content table 300 of FIG. 3, stored in a database) to include a first entry (e.g., entry 315) associated with the first user (e.g., user C), where the first entry includes an identifier of the first media asset (e.g., an identifier for the sports program having a start time at 8 PM and end time at 10 PM), the first start-offset (e.g., +40) and the first end-offset (e.g., 0). For example, if an entry corresponding to user C and the first media asset does not exist in the database, which control circuitry may determine by issuing a select query based on an identifier for user C and the first media asset, control circuitry may issue a create command to the database to create entry 315 in the user-content table to include the identifier for user (e.g., in user-id field 380c), the identifier for the media asset (e.g., in content-id 350c), the first start-offset (e.g., +30 in start-offset field 360c), and the end-offset (e.g., +60 in end-offset filed 370c). For example, if an entry corresponding to user C and the first media asset does exist in the database, control circuitry 704 may issue an update command to the database to update entry 315 in the user-content table to include the identifier for user (e.g., in user-id field 380c), the identifier for the media asset (e.g., in content-id 350c), the first start-offset (e.g., +30 in start-offset field 360c), and the end-offset (e.g., +60 in end-offset filed 370c).

At step 1020, control circuitry 704 (e.g., of a server such as origin server 105, first cache server 110, second cache server 120, a media content source 816, or other server), may receive from a second user device (e.g., a user device 700 of FIG. 7), associated with a second user (e.g., user D of FIG. 3), a second request to store the first media asset (e.g., the sports program having a start time of 8 PM and end time of 10 PM, scheduled for broadcast on channel 5), where the second request includes a second start-offset (e.g., +40, corresponding to start-offset 360d of FIG. 3) from a start time (e.g., 8 PM) of the first media asset, and a first end-offset (e.g., +0) from an end time (e.g., 10 PM) of the first media asset. For example, control circuitry 704 (e.g., within a content distribution network) may receive the command based on a user selection of a program listing for the first media asset (e.g., the sports program having a start time of 8 PM and end time of 10 PM, scheduled for broadcast on channel 5).

At step 1025, control circuitry 704 may update the entry (e.g., entry 405) associated with the first media asset in the content hits table (e.g., content hits table 400 of FIG. 4) to increment a count of requests (e.g., hits 480a) to record the first media asset. For example, control circuitry 704 may issue an update command to a database (e.g., stored on storage 706 of the same or different server) which stores the content-hits table to increment the count of requests from 3 to 4. For example, control circuitry 704, may issue a command to the database to retrieve the count of requests (e.g., hits 480a), increment the count of requests, and then issue a command to the database to write-back the incremented count of requests to the entry (e.g., entry 405).

At step 1030, control circuitry 704 may update a user content table (e.g., user-content table 300 of FIG. 3, stored in a database) to include a second entry (e.g., entry 320) associated with the first user (e.g., user D), where the second entry includes an identifier of the first media asset (e.g., an identifier for the sports program having a start time at 8 PM and end time at 10 PM), the second start-offset (e.g., +40) and the second end-offset (e.g., +60). For example, if an entry corresponding to user D and the first media asset does not exist in the database, which control circuitry may determine by issuing a select query based on an identifier for user D and the first media asset, control circuitry may issue a create command to the database to create entry 320 in the user-content table to include the identifier for user (e.g., in user-id field 380d), the identifier for the media asset (e.g., in content-id 350d), the second start-offset (e.g., +40 in start-offset field 360d), and the end-offset (e.g., 0 in end-offset filed 370d). For example, if an entry corresponding to user D and the first media asset does exist in the database, control circuitry 704 may issue an update command to the database to update entry 320 in the user-content table to include the identifier for user (e.g., in user-id field 380*d*), the identifier for the media asset (e.g., in content-id 350*d*), the first start-offset (e.g., +40 in start-offset field 360*d*), and the end-offset (e.g., 0 in end-offset filed 370*d*).

At step 1035, control circuitry 704 may determine whether the first start-offset (e.g., +30) is larger than a largest start-offset of an entry associated with the first media asset in a content-hits table (e.g., content-hits table 400 of FIG. 4). For example, control circuitry may issue a query command to a database (e.g., stored in storage 706 of one of origin server or other server) to retrieve the largest start-offset (e.g., corresponding to fields 460*a*, with an initial value of 0, assuming that the start-offsets 360*a* and 360*b* received in requests to store the first media asset were 0, prior to receiving the first request to the media asset from the user device corresponding to user C) corresponding to the first media asset (e.g., corresponding to P1). The query command may include the content-id corresponding to the first media asset (e.g., content-id field 450*a*). Control circuitry may compare the first start-offset (e.g., +30, corresponding to field 360*c*, and received in the first user request) to the largest start-offset (e.g., initially 0). Based on determining that the first start-offset (e.g., +30) is larger than the largest start-offset (e.g., 0), the process proceeds to step 1040. Otherwise, if control circuitry 704 determines that the first start-offset is not larger than the largest start offset, the process proceeds to step 1045.

At step 1040, control circuitry 704 may update the largest start-offset (e.g., corresponding to field 460*a* of entry 405) of the entry (e.g., entry 405) associated with the first media asset to the first start-offset based on determining that the first start-offset is larger than the largest start offset. For example, control circuitry 704 may issue an update command to the database (e.g., stored on storage 706 of the same or different server) which stores the content-hits table to update field 460*a* entry 405 to the first start-offset (e.g., +30).

At step 1045, control circuitry 704 may determine whether the second start-offset (e.g., +40) is larger than the largest start-offset of an entry associated with the first media asset in a content-hits table (e.g., content-hits table 400 of FIG. 4). For example, control circuitry may issue a query command to a database (e.g., stored in storage 706 of one of origin server or other server) to retrieve the largest start-offset (e.g., corresponding to fields 460*a*, with a value of +30, after step 1040) corresponding to the first media asset (e.g., corresponding to P1). The query command may include the content-id corresponding to the first media asset (e.g., content-id field 450*a*). Control circuitry may compare the second start-offset (e.g., +40, corresponding to field 360*c*, and received in the first user request) to the largest start-offset (e.g., +30 after step 1040 in this example). Based on determining that the second start-offset (e.g., +40) is larger than the largest start-offset (e.g., +30), the process proceeds to step 1050. Otherwise, if control circuitry 704 determines that the first start-offset is not larger than the largest start offset, the process proceeds to step 1055.

At step 1050, control circuitry 704 may update the largest start-offset (e.g., corresponding to field 460*a* of entry 405) of the entry (e.g., entry 405) associated with the first media asset to the second start-offset based on determining that the first start-offset is larger than the largest start offset. For example, control circuitry 704 may issue an update command to the database (e.g., stored on storage 706 of the same or different server) which stores the content-hits table to update field 460*a* of entry 405 to the second start-offset (e.g., +40).

At step 1055, control circuitry 704 may determine whether the first end-offset (e.g., +60, corresponding to end offset-field 370*c* of FIG. 3 associated with user C) is larger than a largest end-offset of an entry associated with the first media asset in a content-hits table (e.g., content-hits table 400 of FIG. 4). For example, control circuitry may issue a query command to a database (e.g., stored in storage 706 of one of origin server or other server) to retrieve the largest end-offset (e.g., corresponding to fields 470*a*, with an initial value of 0, assuming that the end-offsets 360*a* and 360*b* received in requests to store the first media asset were 0, prior to receiving the first request to the media asset from the user device corresponding to user C) corresponding to the first media asset (e.g., corresponding to P1). The query command may include the content-id corresponding to the first media asset (e.g., content-id field 450*a*). Control circuitry may compare the first end-offset (e.g., +60, corresponding to field 370*c*, and received in the first user request) to the largest start-offset (e.g., initially 0). Based on determining that the first end-offset (e.g., +60) is larger than the largest end-offset (e.g., 0), the process proceeds to step 1060. Otherwise, if control circuitry 704 determines that the first end-offset is not larger than the largest end offset, the process proceeds to step 1065.

At step 1060, control circuitry 704 may update the largest end-offset (e.g., corresponding to field 470*a* of entry 405) of the entry (e.g., entry 405) associated with the first media asset to the first end-offset based on determining that the first end-offset is larger than the largest end offset. For example, control circuitry 704 may issue an update command to the database (e.g., stored on storage 706 of the same or different server) which stores the content-hits table to update field 470*a* of entry 405 to the first end-offset (e.g., +60).

At step 1065, control circuitry 704 may determine whether the second send offset (e.g., +0) is larger than the largest end-offset of the entry associated with the first media asset in a content-hits table (e.g., content-hits table 400 of FIG. 4). For example, control circuitry may issue a query command to a database (e.g., stored in storage 706 of one of origin server or other server) to retrieve the largest end-offset (e.g., corresponding to field 470*a*, with a value of +60, after step 1060) corresponding to the first media asset (e.g., corresponding to P1). The query command may include the content-id corresponding to the first media asset (e.g., content-id field 450*a*). Control circuitry may compare the second end-offset (e.g., 0, corresponding to field 360*d*, and received in the second user request) to the largest end-offset (e.g., +60 after step 1060 in this example). Based on determining that the second end-offset (e.g., 0) is not larger than the largest end-offset (e.g., +60), the process proceeds to step 1075. Otherwise, if control circuitry 704 determines that the second end-offset is larger than the largest end offset, the process proceeds to step 1070.

At step 1070, control circuitry 704 may update the largest end-offset (e.g., corresponding to field 470*a* of entry 405) of the entry (e.g., entry 405) associated with the first media asset to the second end-offset based on determining that the second end-offset is larger than the largest end offset. For example, control circuitry 704 may issue an update command to the database (e.g., stored on storage 706 of the same or different server) which stores the content-hits table to update field 470*a* of entry 405 to the second end-offset.

At step 1075, control circuitry 704 may store media content associated with the first media asset, the largest start-offset and the largest end-offset in one or more storage devices (e.g., of one or more servers or devices, as part of media content source 816 or content distribution network 100) based on the largest start-offset and the largest end offset. In some embodiments, in a shared network DVR system, control circuitry 704 may store a single copy of the first media asset, and media content associated with the largest start-offset and the largest end-offset to a storage device 706 of an origin server (e.g., origin server 105) for shared access by multiple user devices of multiple respective users. In some embodiments, the media asset may be partially stored. For example, the request to record the program may be received while the broadcast of the first media asset is in progress. Control circuitry 704 may store the remaining media content of the broadcast of the first media asset, and may copy the media content for the earlier portion of the first media asset from another stored copy. Control circuitry 704 may then store media content associated with the requested end-offsets and/or the start-offsets In some embodiments, control circuitry 704 may also store the media content associated with the offsets (e.g., the start-offset and/or end-offsets) at cache servers which are located within a same geographic location as a requesting user device in order to exploit spatial locality (e.g., because the media content associated with the start-offset may be first accessed from the cache server, while the first media asset is transferred from the origin server to the cache server for distribution to the requesting user device).

In some embodiments, in a private copy network DVR system, control circuitry 704 may store multiple copies of the first media asset to a storage device of the origin server, for separate access by user of multiple user devices, and may store separate copies of the media content associated with respective start-offsets and end-offsets of each user to a respective cache server that is located within a geographic region of the first user device. In these embodiments, the media content associated with the offsets may be stored at the cache servers in order to exploit spatial locality to the users, and to conserve storage space at the origin server. In some embodiments, a first user device and a second user device may be located in a same geographic location. For example, control circuitry of an origin server (e.g., origin server 105) may receive a first request to store a first media asset from a first user device (e.g., user device 112 of FIG. 1). Control circuitry of the origin server may receive a second request to store the first media asset from a second user device (e.g., user device 116a of FIG. 1). Control circuitry of the origin server may determine whether a first location of the first user device and a second location of the second user device are within a same geographic location. Control circuitry of the origin server may select a first cache server (e.g., first cache server 110 of FIG. 1), based on determining that the first user device and the second user device are within a same geographic location as the first cache server (e.g., by comparing locations and euclidean distances between the respective locations). Control circuitry of the origin server may then direct the first cache server to store media content associated with the start-offsets and/or end-offsets at the first cache server.

In some embodiments, a first user device and a second user device may be located in a different geographic locations. For example, control circuitry of an origin server (e.g., origin server 105) may receive a first request to store a first media asset from a first user device (e.g., user device 112 of FIG. 1). Control circuitry of the origin server may receive a second request to store the first media asset from a second user device (e.g., user device 116a of FIG. 1). Control circuitry of the origin server may determine whether a first location of the first user device and a second location of the second user device are within a same geographic location. Control circuitry may determine that the first user device and the second user device are not within a same geographic location and are within separate geographic locations. Control circuitry of the origin server may select a first cache server (e.g., first cache server 110 of FIG. 1), based on determining that the first user device is within a same geographic location as the first cache server (e.g., by comparing locations and euclidean distances between the respective locations). Control circuitry of the origin server may then direct the first cache server to store media content associated with the start-offsets and/or end-offsets associated with the first user device at the first cache server. Control circuitry of the origin server may select a second cache server (e.g., second cache server 120 of FIG. 1), based on determining that the second user device (e.g., second user device 116b of FIG. 1) is within a same geographic location as the second cache server (e.g., by comparing locations and euclidean distances between the respective locations). Control circuitry of the origin server may then direct the second cache server to store media content associated with the start-offsets and/or end-offsets associated with the second user device at the second cache server.

In some embodiments, in a virtual private copy network DVR system, control circuitry 704 may store multiple copies of the first media asset to a storage device of the origin server, and a single copy of the first media asset to a cache server for shared access. In these embodiments, the storage of the multiple copies at the origin server may satisfy copyright regulations for separate copies for separate users, while maintaining a shared copy for access from the cache server to reduce bandwidth consumption between the origin server and cache server. In some implementations of these embodiments, the media content associated with largest offsets may be stored at a cache server for shared access. In some implementations of these embodiments, separate copies of the media content associated with different offsets may be stored at the cache server. In some embodiments, in a virtual private copy network DVR system, control circuitry 704 may store a single copy of the first media asset at the origin server, and may store media content associated with offsets at a cache server to exploit spatial locality advantage. Dividing the storage of the first media asset at the origin server, while storing the first media asset at the cache server may be beneficial in cases where a viewing does not advance beyond the media content of the offset, such that the first media asset does not need to be retrieved from the origin server to the first cache server. The selection of cache servers based on locations of user devices may proceed in a manner as discussed above in reference to the selection of cache servers in a private network DVR.

In some embodiments, control circuitry 704 (e.g., of an origin server) may store a copy of a first media asset at a cache server in addition to or in lieu of storing the first media asset at the origin server based on determining that a count of requests to store the first media asset (e.g., as indicated by hits 480a in FIG. 4) is greater than a threshold. Control circuitry may direct a selected cache server (e.g., within a same geographic location as a number of user devices requesting to store the first media asset) to store the first media asset to a storage device associated with the cache server.

It is contemplated that the descriptions of FIG. 10 may be used with any other embodiment of this disclosure. In addition, the descriptions described in relation to the algorithm of FIG. 10 may be done in alternative orders or in parallel to further the purposes of this disclosure. As a further example, in some embodiments, several steps may be evaluated in parallel, using multiple logical processor threads, or the algorithm may be enhanced by incorporating branch prediction. Furthermore, it should be noted that the process of FIG. 10 may be implemented on a combination of appropriately configured software and hardware, and that any of the devices or equipment discussed in relation to FIGS. 7-8 could be used to implement one or more portions of the process.

Figure 11:
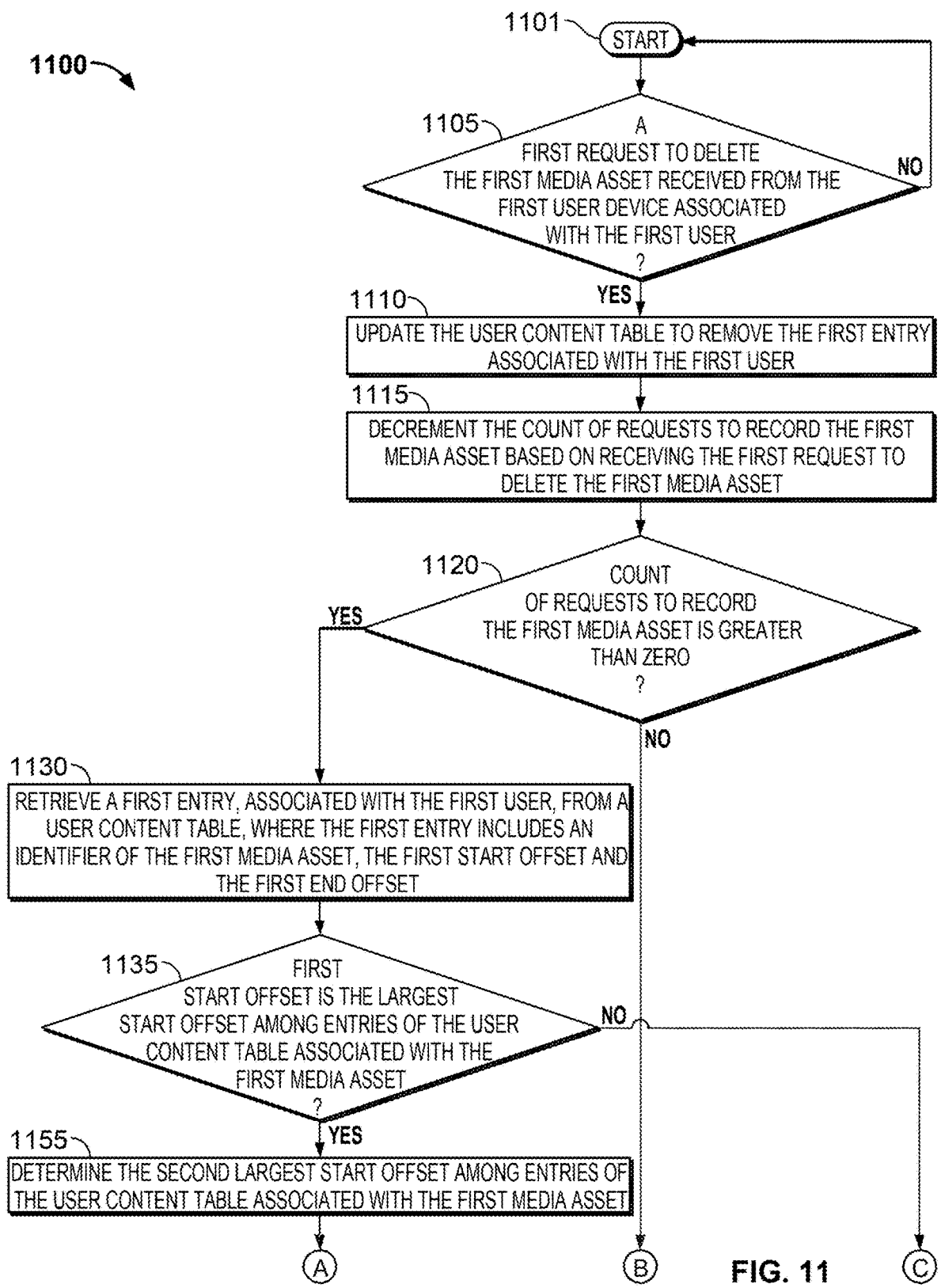
FIG. 11 is a flowchart of an illustrative process for deleting recordings and offsets of a first media asset in accordance with some embodiments of the disclosure.
Figure 11:
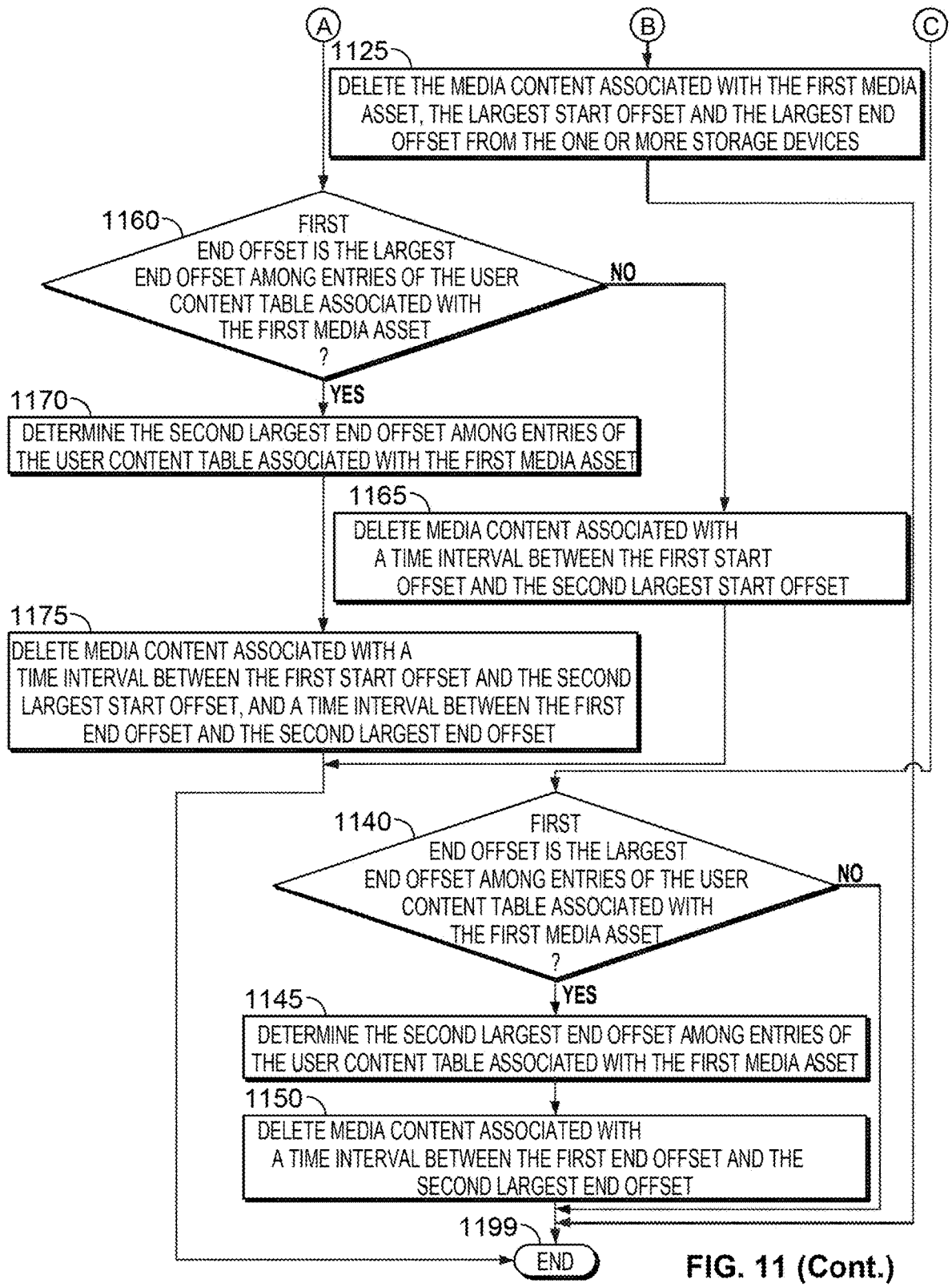

FIG. 11 is a flowchart of an illustrative process 1100 for deleting recordings and offsets of a first media asset in accordance with some embodiments of the disclosure. At step 1105, control circuitry 704 determines whether a request to delete the first media asset has been received from the first user device (e.g., a user device of FIG. 7) associated with the first user (e.g., user C associated with entry 314 of FIG. 3). For example, control circuitry may determine whether a command to delete the first media asset has been received by determining whether a command when received, is a delete command (e.g., whether the command has an identifier or code associated with a delete command) and/or by comparing a content-id or media asset identifier of the received command to the content-hits table by issuing a query command a database that stores the content-hits table (e.g., of FIG. 4) and/or a query command to a database that stores the user content table (e.g., of FIG. 3). Based on determining that the request to delete the first media asset has been received from the first user device, the process proceeds to step 1110, otherwise the process polls back to step 1105.

At step 1110, control circuitry 704 updates the user content table to remove the first entry (e.g., entry 315) associated with the first user (e.g., user C). For example, control circuitry 704 may issue a delete command, that includes the user-id and content-id received in the request to delete the media asset, to a database that stores the user content table to delete an entry associated with a user-id corresponding to the first user (e.g., user-id field 380c corresponding to user C), and associated with the first media asset (e.g., a content-id field 350c). Prior to issuing the delete command, control circuitry may store the contents of the entry in user-content table 300, associated with the first user (e.g., user C) and the first media asset in storage 706.

At step 1115, control circuitry 704 decrements the count of requests to record the first media asset based on receiving the first request to delete the first media asset. For example, control circuitry 704 may issue an update command to a database (e.g., stored on storage 706 of the same or different server) which stores the content-hits table to decrement the count of requests from 4 to 3 (e.g., assuming no other delete requests have been received since the end of process 1000 of the example discussed in reference to FIG. 10). For example, control circuitry 704, may issue a command to the database to retrieve the count of requests (e.g., hits 480a), decrement the count of requests, and then issue a command to the database to write-back the decremented count of requests to the entry (e.g., entry 405).

At step 1120, control circuitry 704 may determine whether the count of requests to record the first media asset (e.g., hits value 480a), is greater than zero. For example, control circuitry 704 may issue a query request to the content-hits table including a content-id or media asset identifier associated with the first media asset, and may retrieve the hits value 480a. Based on determining that the count of requests to record the first media asset is greater than zero, the process proceeds to step 1130. Otherwise, the process proceeds to step 1125.

At step 1125, control circuitry 704 may delete the media content associated with the first media asset, the largest start-offset and the largest end-offset from the one or more storage devices. For example, control circuitry 704 may issue a delete command to one or more storage device at one or more servers to delete the media content associated with the first media asset, the largest offset, depending on where the media content is stored, as discussed above in reference to step 1075 of FIG. 10. For example, control circuitry 704 may delete the media content associated with the first media asset, the largest start-offset and the largest end offset, based on determining that the count of request requests to record the first media asset is not greater than zero, and is therefore zero, indicating there are no other users who may access the content other than the first user.

At step 1130, control circuitry 704 may retrieve a first entry (e.g., entry 315 of user content table 300), associated with the first user (e.g., user C), from a user content table, where the first entry includes an identifier of the first media asset (e.g., content-id of field 350c of entry 315), the first start-offset (e.g., start-offset field 360c), and the first end-offset (e.g., end-offset field 370c). Control circuitry may issue a query command, including the user-id and the content-id corresponding to those received as part of the request to delete in step 1105, to a database that stores the user-content table. In some embodiments, where the entry has been removed (e.g., in step 1110), the entry may be retrieved from storage 706, where it was stored as discussed in reference to step 1110.

At step 1135, control circuitry 704 may determine whether the first start-offset is the largest start-offset among entries of the user content table (e.g., 300 of FIG. 3) associated with the first media asset. For example, control circuitry 704 may issue a query to the database that stores the user-content table to compare the first start-offset to all start-offsets in the user content table. Based on determining that the first start-offset is the largest start offset, the process may proceed to step 1155, in order to delete media content associated with an interval between the first start-offset (the largest start offset), and the second largest start offset. Based on determining that the first start-offset is not the largest start offset, the process proceeds to step 1140 to determine media content associated with the first end-offset should be deleted.

At step 1155, the control circuitry 704 may, based on determining that the first start-offset is the largest start-offset among entries of the user content table associated with the first media asset, determine the second largest start-offset among entries of the user content table (e.g., 300 of FIG. 3) associated with the first media asset. For example, control circuitry 704 may issue a command to the database to retrieve a set of all start-offsets less than the first start-offset and then issue a command to sort the retrieved set of start-offsets by ascending value and extract the largest start-offset of the sorted set of start-offsets as the second largest start offset.

At step 1160, control circuitry 704 may determine whether the first end-offset is the largest end-offset among entries of the user content table (e.g., 300 of FIG. 3) associated with the first media asset. For example, control circuitry 704 may issue a query to the database that stores the user-content table to compare the first end-offset to all end-offsets in the user content table. Based on determining that the first end-offset is the largest end offset, the process may proceed to step 1170, in order to delete media content associated with an interval between the first end-offset (the largest end offset), and the second largest end offset. Based on determining that the first end-offset is not the largest end offset, the process proceeds to step 1165 to delete media content associated with the first media asset and a time interval between the first start-offset and the second largest start offset.

At step 1165, control circuitry 704 may delete the media content associated with a time interval between the first start-offset and the second largest start offset. For example, control circuitry 704 may issue a delete command to one or more storage device at one or more servers to delete the media content associated with the media content associated with the time interval between the first start-offset and the second largest start offset, depending on where the media content is stored, as discussed above in reference to step 1075 of FIG. 10.

At step 1170, the control circuitry 704 may, based on determining that the first end-offset is the largest end-offset among entries of the user content table associated with the first media asset, determine the second largest end-offset among entries of the user content table (e.g., 300 of FIG. 3) associated with the first media asset. For example, control circuitry 704 may issue a command to the database to retrieve a set of all end-offsets less than the first end-offset and then issue a command to sort the retrieved set of end-offsets by ascending value and extract the largest end-offset of the sorted set of end-offsets as the second largest end offset.

At step 1175, control circuitry 704 may delete the media content associated with a time interval between the first start-offset and the second largest start offset, and a time interval between the first end-offset and the second largest end offset. For example, control circuitry 704 may issue a delete command to one or more storage device at one or more servers to delete the media content associated with the media content associated with the time interval between the first start-offset and the second largest start offset, and the media content associated with the time interval between the first end-offset and the second largest end-offset depending on where the media content is stored, as discussed above in reference to step 1075 of FIG. 10.

At step 1140, control circuitry 704 may determine whether the first end-offset is the largest end-offset among entries of the user content table (e.g., 300 of FIG. 3) associated with the first media asset. For example, control circuitry 704 may issue a query to the database that stores the user-content table to compare the first end-offset to all end-offsets in the user content table. Based on determining that the first end-offset is the largest end offset, the process may proceed to step 1145, in order to delete media content associated with an interval between the first end-offset (the largest end offset), and the second largest end offset. Based on determining that the first end-offset is not the largest end offset, the process may terminate, as the first media asset and offsets may still be requested for access by other users.

At step 1145, the control circuitry 704 may, based on determining that the first end-offset is the largest end-offset among entries of the user content table associated with the first media asset, determine the second largest end-offset among entries of the user content table (e.g., 300 of FIG. 3) associated with the first media asset. For example, control circuitry 704 may issue a command to the database to retrieve a set of all end-offsets less than the first end-offset and then issue a command to sort the retrieved set of end-offsets by ascending value and extract the largest end-offset of the sorted set of end-offsets as the second largest end offset.

At step 1150, control circuitry 704 may delete the media content associated with a time interval between the first end-offset and the second largest end offset. For example, control circuitry 704 may issue a delete command to one or more storage device at one or more servers to delete the media content associated with the first media asset, and the media content associated with the time interval between the first end-offset and the second largest end-offset depending on where the media content is stored, as discussed above in reference to step 1075 of FIG. 10.

It is contemplated that the descriptions of FIG. 11 may be used with any other embodiment of this disclosure. In addition, the descriptions described in relation to the algorithm of FIG. 11 may be done in alternative orders or in parallel to further the purposes of this disclosure. As a further example, in some embodiments, several steps may be evaluated in parallel, using multiple logical processor threads, or the algorithm may be enhanced by incorporating branch prediction. For example, step 1110, to update the user content table to remove the first entry may be performed just before part 1199 of the flowchart. Furthermore, it should be noted that the process of FIG. 11 may be implemented on a combination of appropriately configured software and hardware, and that any of the devices or equipment discussed in relation to FIGS. 7-8 could be used to implement one or more portions of the process.

Figure 12:
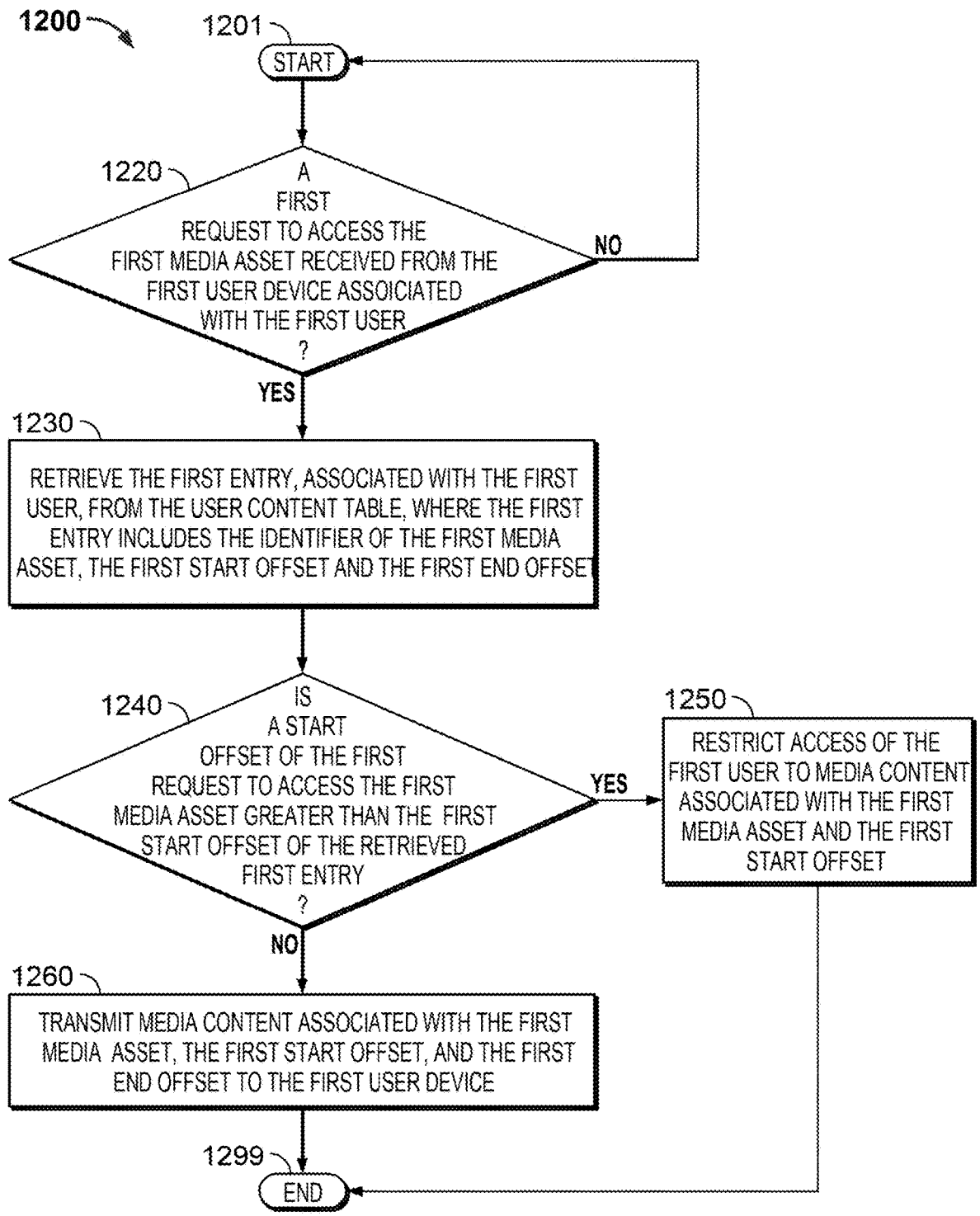
FIG. 12 is a flowchart of an illustrative process for restricting access to offsets of a first media asset in accordance with some embodiments of the disclosure.

FIG. 12 is a flowchart of an illustrative process 1200 for restricting access to offsets of a first media asset in accordance with some embodiments of the disclosure. At step 1220, control circuitry 704 determines whether a first request to access the first media asset has been received from the first user device associated with the first user (e.g., user C). For example, control circuitry 704 may receive a command, and determine that the received command is a request to access the first media asset (e.g., by determining whether the command as an identifier or code associated with an access command), and/or by comparing a content-id or media asset identifier of the received command to the content-hits table by issuing a query command a database that stores the content-hits table (e.g., of FIG. 4) and/or a query command to a database that stores the user content table (e.g., of FIG. 3). For example, the received command to access the first media asset may include a third start-offset of +35 and a third end-offset of 0. Based on determining that the first request to access the first media asset has been received from the first user device, the process proceeds to step 1230. Otherwise, the process polls on step 1220.

At step 1230, control circuitry 704 retrieves, from the first entry (e.g., entry 315 of FIG. 3), associated with the first user (e.g. user C), from the user content table (e.g., user content table 300 of FIG. 3), where the first entry includes the identifier of the first media asset, the first start-offset (e.g., +30, corresponding to start-offset field 360*c* of entry 315), and the first end-offset (e.g., +60, corresponding to end-offset field 370*c* of entry 315). The control circuitry 704 may, based on receiving the first request to access the first media asset, retrieve the first entry (e.g., by issuing a query to a database storing the user content table), associated with the first user, from the user content table, where the first entry includes the identifier of the first media asset (e.g., content-id field 350*c* of entry 315), the first start-offset (e.g., +30, of start-offset field 360*c* of entry 315) and the first end-offset (e.g., +60, of end-offset field 370*c* of entry 315).

At step 1240, control circuitry 704 determines whether a start-offset of the first request to access the first media asset is greater than the first start-offset of the retrieved first entry. For example, control circuitry 704 may compare the start-offset received as part of the request to access (e.g., +35) to the first start-offset of the first entry (e.g., +30). Based on determining that the start-offset (e.g., +35) of the first request is greater than the first start-offset (e.g., +30) of the retrieved entry from user-content table 300, the process proceeds to step 1250 to restrict access of the first user to the media content associated with the first media asset and the first start offset, otherwise, the process proceeds to step 1260 to transmit media content to the first user device.

At step 1250, control circuitry 704 restricts access of the first user to media content associated with the first media asset and the first start offset. The control circuitry may restrict access of the first user to media content associated with the first media asset and the first start-offset by retrieving media content up to the first start-offset (e.g., +30) without retrieving media up to the third start-offset (e.g., +35), even though media content up to +40 is available, because +40 is the largest start-offset (e.g., as indicated in content-hits table 400 and user-content table 400 after the second request to store the first media asset is received, as described in FIG. 9). For example, the first start-offset (e.g., +30) may not be the largest start-offset in an associated entry in the content-hits table, if another request to store the first media asset had been received from a second user device 9 e.g., associated with user D) having start-offset (e.g., +40), which is greater than the first start-offset (e.g., +30). In some embodiments, the control circuitry may generate for display a notification that the first user is restricted from accessing media content associated with an offset larger than the first offset (e.g., +30) that was included as part of the first request to record the first media asset received from the first user device associated with the first user.

At step 1260, control circuitry 704 transmits media content associated with the first media asset, the first start-offset and the first end-offset to the first user device. For example, control circuitry 704 may transmit media content associated with the first media asset, the first start offset, and the first end-offset to the user device. For example, the system may deliver, across an internet protocol connection to the first user device (e.g., a user device of FIG. 7), media content (e.g., audio and/or video) associated with the first media asset, the first start-offset (e.g., +30), and the first end-offset (e.g., of +40) to the user device.

The server from which the media content is delivered to the first user device may vary depending on the type of network DVR system, as discussed in reference to step 1075 of FIG. 10. In some embodiments, in a shared copy network DVR, a single copy of the first media asset may be stored in an origin server (e.g., 105 of FIG. 1), and transmitted from the origin server to a first user device. In implementations of the shared copy network DVR, the media content associated with offsets may be stored in a cache server (e.g., first cache server 105) and/or the origin server, and may be transmitted from the cache server to the first user device. In some embodiments, in a private copy network DVR, multiple copies associated with the first media asset may be stored in the origin server (e.g., 105 of FIG. 1), and control circuitry 704 may direct the origin server to transmit media content from a respective copy associated with the first user and/or first user device from the origin server to the first user device. In some embodiments of the virtual private copy network DVR, a single copy of the first media asset may be stored at the origin server for shared access by multiple user devices, and media content from the single copy may be transmitted to the first user device. In some implementations of virtual private copy network DVR, separate copies of the offsets may be stored in a cache server for multiple users, and media content from a respective copy may be transmitted to the first user device.

In some embodiments, the media content associated with the first media asset and offsets may be retrieved, using a Smart Download scheme, from other user devices, instead of from servers, in order to reduce using bandwidth and server resources. This may be useful in cases where a first user device and second user device are located within close proximity (e.g., to make use of mesh networks), or may be useful when a first user device and a second user device are connected by a local area network, are located within a same extended service set of a wireless network. For example, the control circuitry 704 (e.g., of a first user device 112) may issue a request for the first media asset and/or offsets to another user device (e.g., of a second user device 116a/b). Control circuitry 704 (e.g., of the second user device 116a/b) may determine whether it has a copy of the first media asset and/or offsets. Based on determining that it has a copy of the first media asset and/or offsets, the control circuitry 704 (e.g., of the second user device 116a/b) may transmit media content associated with the first media asset and/or offsets to the first user device.

In some embodiments, the Smart Download scheme may be based on spatial location of user devices. For example, control circuitry of a first user device (e.g., associated with a user A) may transmit to a server (e.g., an origin server or cache server) a request to access a media asset. Control circuitry of the server may determine a location of the first user device based on an IP address, other identifier of the first user device, and/or location information (e.g., GPS coordinates, cellular coordinates, any other suitable location information or any combination thereof) received from the first user device (e.g., as part of the request or other transmission from the first user device). Control circuitry of the server may then determine whether the requested media asset has been accessed and stored to other user devices within the same location of the first user device. For example, control circuitry may query a database for other user devices that have downloaded the media asset requested for access by the first user device. Control circuitry may determine that a second user device (e.g., associated with a user B) and a third user device (e.g., associated with a user C). Control circuitry of the server may then transmit a notification to the second user device and the third user device requesting permission to enable the first user device to access the media asset that has been downloaded and stored to the second user device and the third user device. Based on receiving a confirmation of acceptance for either of the second user device and/or the third user device, control circuitry of the server may transmit a notification to the first user device which includes a URL or other suitable link to access the media asset from either of the second user device and/or the third user device. Control circuitry of the first user device may access the media asset from the second user and/or third user device using a wi-fi direct network, mesh network, or any other suitable network.

In some embodiments, the control circuitry of the second user device and/or control circuitry of the third user device be configured to automatically grant permission to the first user device to access the media asset without generating for display an option to grant permission to a respective user of the second user device (e.g., user B), and/or a respective user of the third user device (e.g., user C). Throughout this process, control circuitry of the server, control circuitry of the first user device, control circuitry of the second user device, and/or control circuitry of the third user device may preserve identity of respective users by de-identifying the requestor and grantor of access to the media asset. In some embodiments, control circuitry of the requesting first user device may send requests to devices associated with users that are related to the user of the first user device. For example, control circuitry of the requesting first user device may send requests to devices associated with users from a contacts list or subset of the contacts list (e.g., a friends group, a family group, community group, social networking group, etc.) associated with the first user. In some embodiments, control circuitry of the granting second user device and/or control circuitry of the granting third user device may grant access to the media asset to user devices associated with users associated with a respective user of the second user device and/or third user device. For example, control circuitry of the granting user device grant requests to access to user devices associated users from a contacts list or subset of the contacts list (e.g., a friends group, a family group, community group, social networking group, etc.) of a user of the granting user device.

It is contemplated that the descriptions of FIG. 12 may be used with any other embodiment of this disclosure. In addition, the descriptions described in relation to the algorithm of FIG. 12 may be done in alternative orders or in parallel to further the purposes of this disclosure. As a further example, in some embodiments, several steps may be evaluated in parallel, using multiple logical processor threads, or the algorithm may be enhanced by incorporating branch prediction. Furthermore, it should be noted that the process of FIG. 12 may be implemented on a combination of appropriately configured software and hardware, and that any of the devices or equipment discussed in relation to FIGS. 7-8 could be used to implement one or more portions of the process.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for storing media assets, comprising:
    determining to record a media asset for a first profile and for a second profile, each of the first profile and the second profile associated with a first offset and with a second offset, respectively, for the media asset;
    comparing the first offset and the second offset to determine a largest end-offset from an end time of the media asset; and
    storing media content associated with the media asset based on the largest end-offset in one or more storage devices.

2. The method of claim 1, further comprising:
    receiving, from a first device associated with the first profile, a first request to store the media asset, wherein the first request comprises a first end-offset from an end time of the media asset;
    receiving, from a second device associated with the second profile, a second request to store the media asset, wherein the second request comprises a second end-offset from the end time of the media asset;
    wherein comparing the first offset and the second offset comprises:
        determining whether the first end-offset is larger than a largest end-offset of the entry associated with the media asset;
        determining whether the second end-offset is larger than the largest end-offset of the entry associated with the media asset;
    updating the largest end-offset of the entry associated with the media asset to the first end-offset based on determining that the first end-offset is larger than the largest end-offset;
    updating the largest end-offset of the entry associated with the media asset to the second end-offset based on determining that the second end-offset is larger than the largest end-offset; and
    storing the media content associated with the media asset based on the largest end-offset in the one or more storage devices.

3. The method of claim 2, wherein:
    the first request further comprises a first start-offset from the start time of the media asset;
    the second request further comprises a second start-offset from the start time of the media asset;
    comparing the first offset and the second offset further comprises:
        determining whether the first start-offset is larger than a largest start-offset of an entry associated with the media asset in a content-hits table;
        determining whether the second start-offset is larger than the largest start-offset of the entry associated with the media asset; and
    the method further comprising:
        updating the largest start-offset of the entry associated with the media asset to the first start-offset based on determining that the first start-offset is larger than the largest start-offset;
        updating the largest start-offset of the entry associated with the media asset to the second start-offset based on determining that the second start-offset is larger than the largest start-offset; and
        storing the media content associated with the media asset based on the largest start-offset and the largest end-offset in the one or more storage devices.

4. The method of claim 2, wherein storing the media content comprises storing a single copy of the media content at a server, in response to receiving the first request to store the media asset from the first device associated with the first profile and the second request to store the media asset from the second device associated with the second profile.

5. The method of claim 2, further comprising:
    in response to receiving the first request to store the media asset, updating the entry associated with the media asset in a content-hits table to increment a count of requests to record the media asset; and
    in response to receiving the second request to store the media asset, updating the entry associated with the media asset in the content-hits table to increment the count of requests to record the media asset.

6. The method of claim 3, further comprising:
in response to receiving the first request, updating a profile-content table to include a first entry associated with the first profile, wherein the first entry comprises an identifier of the media asset, the first start-offset and the first end-offset; and
in response to receiving the second request, updating the profile-content table to include a second entry associated with the second profile, wherein the second entry comprises the identifier of the media asset and the second start-offset.

7. The method of claim 6, further comprising:
receiving, from the first device associated with the first profile, a first request to delete the media asset;
decrementing the count of requests to record the media asset in response to receiving the first request to delete the media asset;
determining whether the count of requests to record the media asset is greater than zero; and
based on determining that the count of requests to record the media asset is equal to zero, deleting the media content associated with the media asset, the largest start-offset and the largest end-offset from the one or more storage devices.

8. The method of claim 3, further comprising:
receiving, from the first device associated with the first profile, a first request to delete the media asset;
decrementing the count of requests to record the media asset in response to receiving the first request to delete the media asset;
determining whether the count of requests to record the media asset is greater than zero; and
based on determining that the count of requests to record the media asset is greater than zero:
  retrieving a first entry, associated with the first profile, from a profile-content table, wherein the first entry comprises an identifier of the media asset, the first start-offset and the first end-offset;
  determining whether the first start-offset is a largest start-offset among entries of the profile-content table associated with the media asset;
  based on determining that the first start-offset is the largest start-offset among entries of the profile-content table associated with the media asset, determining a second largest start-offset among entries of the profile-content table associated with the first media asset;
  determining whether the first end-offset is a largest end-offset among entries of the profile-content table associated with the media asset;
  based on determining that the first end-offset is the largest start-offset among entries of the profile-content table, determining a second largest end-offset among entries of the profile-content table associated with the media asset; and
  deleting media content associated with a time interval between the first start-offset and the second largest start-offset, and a time interval between the first end-offset and the second largest end-offset, based on determining that the first start-offset is the largest end-offset, determining that the first end-offset is the largest end-offset and receiving the first request to delete the media asset.

9. The method of claim 6, further comprising:
receiving, from the first device associated with the first profile, a first request to delete the media asset;
in response to receiving the first request to delete the media asset, updating the profile-content table to remove the first entry associated with the first profile;
receiving, from the second device associated with the second profile, a second request to delete the media asset; and
in response to receiving the second request to delete the media asset, updating the profile-content table to remove the second entry associated with the second profile.

10. The method of claim 6, further comprising:
receiving, from the first device associated with the first profile, a request to access the media asset;
in response to receiving the request to access the media asset, retrieving the first entry, associated with the first profile, from the profile-content table, wherein the first entry comprises the identifier of the media asset, the first start-offset and the first end-offset; and
transmitting media content associated with the media asset, the first start-offset, and the first end-offset to the first device.

11. A system for storing media assets, comprising:
one or more storage devices; and
control circuitry configured to:
  determine to record a media asset for a first profile and for a second profile, each of the first profile and the second profile associated with a first offset and with a second offset, respectively, for the media asset;
  compare the first offset and the second offset to determine a largest end-offset from an end time of the media asset; and
  store media content associated with the media asset based on the largest end-offset in one or more storage devices.

12. The system of claim 11, wherein:
the control circuitry is further configured to:
  receive, from a first device associated with the first profile, a first request to store the media asset, wherein the first request comprises a first end-offset from an end time of the media asset;
  receive, from a second device associated with the second profile, a second request to store the media asset, wherein the second request comprises a second end-offset from the end time of the media asset;
wherein the control circuitry is configured to compare the first offset and the second offset by:
  determining whether the first end-offset is larger than a largest end-offset of the entry associated with the media asset;
  determining whether the second end-offset is larger than the largest end-offset of the entry associated with the media asset;
wherein the control circuitry is further configured to:
  update the largest end-offset of the entry associated with the media asset to the first end-offset based on determining that the first end-offset is larger than the largest end-offset;
  update the largest end-offset of the entry associated with the media asset to the second end-offset based on determining that the second end-offset is larger than the largest end-offset; and
  store the media content associated with the media asset based on the largest end-offset in the one or more storage devices.

13. The system of claim 12, wherein:
the first request further comprises a first start-offset from the start time of the media asset;

the second request further comprises a second start-offset from the start time of the media asset;

wherein the control circuitry is configured to compare the first offset an e second offset by:

determining whether the first start-offset is larger than a largest start-offset of an entry associated with the media asset in a content-hits table;

determining whether the second start-offset is larger than the largest start-offset of the entry associated with the media asset; and wherein the control circuitry is further configured to:

update the largest start-offset of the entry associated with the media asset to the first start-offset based on determining that the first start-offset is larger than the largest start-offset;

update the largest start-offset of the entry associated with the media asset to the second start-offset based on determining that the second start-offset is larger than the largest start-offset; and store the media content associated with the media asset based on the largest start-offset and the largest end-offset in the one or more storage devices.

14. The system of claim 12, wherein the control circuitry is configured to store the media content by storing a single copy of the media content at a server, in response to receiving the first request to store the media asset from the first device associated with the first profile and the second request to store the media asset from the second device associated with the second profile.

15. The system of claim 12, wherein the control circuitry is configured to:

in response to receiving the first request to store the media asset, update the entry associated with the media asset in a content-hits table to increment a count of requests to record the media asset; and in response to receiving the second request to store the media asset, update the entry associated with the media asset in the content-hits table to increment the count of requests to record the media asset.

16. The system of claim 13, wherein the control circuitry is configured to:

in response to receiving the first request, update a profile-content table to include a first entry associated with the first profile, wherein the first entry comprises an identifier of the media asset, the first start-offset and the first end-offset; and in response to receiving the second request, update the profile-content table to include a second entry associated with the second profile, wherein the second entry comprises the identifier of the media asset and the second start-offset.

17. The system of claim 16, wherein the control circuitry is configured to:

receive, from the first device associated with the first profile, a first request to delete the media asset;

decrement the count of requests to record the media asset in response to receiving the first request to delete the media asset;

determine whether the count of requests to record the media asset is greater than zero; and based on determining that the count of requests to record the media asset is equal to zero, delete the media content associated with the media asset, the largest start-offset and the largest end-offset from the one or more storage devices.

18. The system of claim 13, wherein the control circuitry is configured to:

receive, from the first device associated with the first profile, a first request to delete the media asset;

decrement the count of requests to record the media asset in response to receiving the first request to delete the media asset;

determine whether the count of requests to record the media asset is greater than zero; and based on determining that the count of requests to record the media asset is greater than zero:

retrieve a first entry, associated with the first profile, from a profile-content table, wherein the first entry comprises an identifier of the media asset, the first start-offset and the first end-offset;

determine whether the first start-offset is a largest start-offset among entries of the profile-content table associated with the media asset;

based on determining that the first start-offset is the largest start-offset among entries of the profile-content table associated with the media asset, determine a second largest start-offset among entries of the profile-content table associated with the first media asset;

determine whether the first end-offset is a largest end-offset among entries of the profile-content table associated with the media asset;

based on determining that the first end-offset is the largest start-offset among entries of the profile-content table, determine a second largest end-offset among entries of the profile-content table associated with the media asset; and delete media content associated with a time interval between the first start-offset and the second largest start-offset, and a time interval between the first end-offset and the second largest end-offset, based on determining that the first start-offset is the largest end-offset, determine that the first end-offset is the largest end-offset and receiving the first request to delete the media asset.

19. The system of claim 16, wherein the control circuitry is configured to:

receive, from the first device associated with the first profile, a first request to delete the media asset;

in response to receiving the first request to delete the media asset, update the profile-content table to remove the first entry associated with the first profile;

receive, from the second device associated with the second profile, a second request to delete the media asset; and in response to receiving the second request to delete the media asset, update the profile-content table to remove the second entry associated with the second profile.

20. The system of claim 16, wherein the control circuitry is configured to:

receive, from the first device associated with the first profile, a request to access the media asset;

in response to receiving the request to access the media asset, retrieve the first entry, associated with the first profile, from the profile-content table, wherein the first entry comprises the identifier of the media asset, the first start-offset and the first end-offset; and transmit media content associated with the media asset, the first start-offset, and the first end-offset to the first device.

* * * * *